(12) United States Patent
Kato

(10) Patent No.: US 10,286,534 B2
(45) Date of Patent: May 14, 2019

(54) DRIVING TOOL

(71) Applicant: MAKITA CORPORATION, Anjo-Shi (JP)

(72) Inventor: Itsuku Kato, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 1055 days.

(21) Appl. No.: 14/685,783

(22) Filed: Apr. 14, 2015

(65) Prior Publication Data

US 2015/0298308 A1 Oct. 22, 2015

(30) Foreign Application Priority Data

Apr. 16, 2014 (JP) ................................. 2014-084678

(51) Int. Cl.
*B25C 1/00* (2006.01)
*B25C 1/06* (2006.01)
(Continued)

(52) U.S. Cl.
CPC ................ *B25C 1/06* (2013.01); *B25C 1/008* (2013.01); *B25C 1/04* (2013.01); *H02P 3/08* (2013.01)

(58) Field of Classification Search
CPC ...... B25D 2216/0023; B25D 2250/221; B25D 11/005; B25D 11/12; B25D 2250/255;
(Continued)

(56) References Cited

U.S. PATENT DOCUMENTS 1,071,387 A 8/1913 Behr
1,829,609 A 10/1931 Robinson
(Continued)

FOREIGN PATENT DOCUMENTS

JP S63229274 A 9/1988
JP H01115579 A 5/1989
(Continued)

OTHER PUBLICATIONS

Office Action from the Japanese Patent Office dated Jun. 2, 2015 in related Japanese application No. 2012-088842, and translation of substantive portions thereof.
(Continued)

*Primary Examiner* — Robert F Long
(74) *Attorney, Agent, or Firm* — J-Tek Law PLLC; Jeffrey D. Tekanic; Scott T. Wakeman

(57) ABSTRACT

A driving tool, such as a nailer, includes an electric motor, a crank mechanism driven by the electric motor, and a control apparatus for driving the electric motor. A crank-angle detection or calculation unit (109E) detects the crank angle of the crank mechanism or the motor in order to detect the operation state of the electric motor and a stopped time period of the motor is calculated from the crank angle. A sleep-control unit (109A) switches the driving tool between a sleep mode and a drive-enabled mode. If the stopped time period of the electric motor exceeds a prescribed time period, then the sleep-control unit (109A) switches the driving tool to the sleep mode. In the sleep mode, the electric current supplied to one or more of the control units constituting the control apparatus is reduced or cut off, thereby reducing the power consumption of the driving tool.

21 Claims, 9 Drawing Sheets

(51) Int. Cl.
*B25C 1/04* (2006.01)
*H02P 3/08* (2006.01)

(58) Field of Classification Search
CPC ..... H02P 4/00; H02P 3/08; B25C 1/06; B25C 1/008; B25C 5/15
USPC ............ 227/2, 107, 119–120, 140; 173/1–11
See application file for complete search history.

(56) References Cited

U.S. PATENT DOCUMENTS

| | | | |
|---|---|---|---|
| 3,552,274 A | 1/1971 | Bojan et al. | |
| 3,602,103 A | 8/1971 | Powers | |
| 3,638,534 A | 2/1972 | Ramspeck | |
| 3,821,992 A | 7/1974 | Matsuo | |
| 3,824,898 A | 7/1974 | Pauliukonis | |
| 3,878,902 A | 4/1975 | Matsuo | |
| 3,995,703 A | 12/1976 | Wanner | |
| 4,344,555 A | 8/1982 | Wolfberg | |
| 5,193,730 A | 3/1993 | Tanaka et al. | |
| 5,440,215 A * | 8/1995 | Gilmore | B23P 19/066 173/178 |
| 5,605,268 A | 2/1997 | Hayashi et al. | |
| 5,772,096 A | 6/1998 | Osuka et al. | |
| 6,499,643 B1 | 12/2002 | Hewitt | |
| 6,505,767 B2 | 1/2003 | Thieleke et al. | |
| 6,604,666 B1 | 8/2003 | Pedicini et al. | |
| 6,705,503 B1 | 3/2004 | Pedicini et al. | |
| 6,755,336 B2 | 6/2004 | Harper et al. | |
| 6,971,567 B1 | 12/2005 | Cannaliato et al. | |
| 7,419,079 B2 | 9/2008 | Chen et al. | |
| 7,793,811 B1 | 9/2010 | Pedicini et al. | |
| 8,079,504 B1 | 12/2011 | Pedicini et al. | |
| 8,167,183 B2 | 5/2012 | Matsunaga et al. | |
| 8,215,528 B2 | 7/2012 | Matsunaga et al. | |
| 8,453,901 B2 | 6/2013 | Suda | |
| 8,622,271 B2 | 1/2014 | Shima et al. | |
| 8,960,516 B2 | 2/2015 | Iijima et al. | |
| 9,276,509 B2 | 3/2016 | Kato et al. | |
| 9,438,141 B2 | 9/2016 | Ishikawa et al. | |
| 9,543,871 B2 | 1/2017 | Kato | |
| 9,555,530 B2 | 1/2017 | Pedicini et al. | |
| 9,774,273 B2 * | 9/2017 | Suzuki | H02M 7/003 |
| 2002/0175656 A1 * | 11/2002 | Matsunaga | H02J 7/0031 320/128 |
| 2002/0185514 A1 * | 12/2002 | Adams | B25C 1/008 227/2 |
| 2004/0217727 A1 * | 11/2004 | Gilmore | B23P 19/066 318/599 |
| 2004/0232194 A1 | 11/2004 | Pedicini et al. | |
| 2005/0001004 A1 | 1/2005 | Fujisawa et al. | |
| 2005/0023017 A1 * | 2/2005 | Sakai | B25D 11/125 173/201 |
| 2005/0217874 A1 | 10/2005 | Forster et al. | |
| 2005/0219785 A1 * | 10/2005 | Gorti | B25C 1/06 361/160 |
| 2006/0185865 A1 * | 8/2006 | Jung | B25D 16/006 173/48 |
| 2007/0045377 A1 | 3/2007 | Towfighi | |
| 2007/0056934 A1 * | 3/2007 | Hsu | B23K 9/201 219/98 |
| 2007/0138230 A1 | 6/2007 | Gschwend et al. | |
| 2008/0017689 A1 | 1/2008 | Simonelli et al. | |
| 2008/0073405 A1 | 3/2008 | Shima et al. | |
| 2008/0190988 A1 | 8/2008 | Pedicini et al. | |
| 2008/0217372 A1 | 9/2008 | Webb | |
| 2008/0223894 A1 * | 9/2008 | Cruise | B25C 1/008 227/2 |
| 2009/0090762 A1 | 4/2009 | Leimbach et al. | |
| 2009/0108046 A1 * | 4/2009 | Huang | B25C 1/008 227/8 |
| 2009/0184148 A1 | 7/2009 | Dittrich | |
| 2009/0250500 A1 * | 10/2009 | Brendel | B25C 1/06 227/132 |
| 2009/0321492 A1 | 12/2009 | Yukihiro et al. | |
| 2010/0116863 A1 * | 5/2010 | Suda | B25C 1/008 227/8 |
| 2010/0213235 A1 | 8/2010 | Pedicini et al. | |
| 2010/0236802 A1 | 9/2010 | Berger et al. | |
| 2010/0237124 A1 | 9/2010 | Shima et al. | |
| 2010/0237126 A1 | 9/2010 | Yukata et al. | |
| 2010/0294824 A1 | 11/2010 | Takemura et al. | |
| 2010/0301091 A1 * | 12/2010 | Liang | B25C 1/008 227/8 |
| 2011/0057014 A1 * | 3/2011 | Yang | B25C 1/008 227/8 |
| 2011/0108600 A1 | 5/2011 | Pedicini et al. | |
| 2011/0114692 A1 * | 5/2011 | Liang | B25C 1/04 227/2 |
| 2011/0132959 A1 * | 6/2011 | Hlinka | B25C 1/008 227/8 |
| 2011/0155403 A1 | 6/2011 | Rohrer | |
| 2011/0198381 A1 * | 8/2011 | McCardle | B25C 1/047 227/8 |
| 2011/0240709 A1 | 10/2011 | Oouchi | |
| 2011/0273117 A1 | 11/2011 | Nakamura et al. | |
| 2012/0019177 A1 | 1/2012 | Kaufmann et al. | |
| 2012/0187178 A1 | 7/2012 | Campbell | |
| 2012/0286014 A1 | 11/2012 | Pedicini et al. | |
| 2013/0099710 A1 * | 4/2013 | Okamoto | A61C 1/0015 318/434 |
| 2013/0193881 A1 * | 8/2013 | Muto | B25F 5/00 318/139 |
| 2013/0269961 A1 * | 10/2013 | Lim | B25F 5/001 173/1 |
| 2013/0284471 A1 * | 10/2013 | Eshleman | B25B 21/00 173/1 |
| 2013/0331994 A1 * | 12/2013 | Ng | B25B 23/147 700/275 |
| 2014/0054350 A1 | 2/2014 | Pedicini | |
| 2014/0084832 A1 * | 3/2014 | Sato | H02P 27/08 318/452 |
| 2014/0158740 A1 | 6/2014 | Akutsu et al. | |
| 2014/0165525 A1 * | 6/2014 | Nagata | A01D 34/78 56/11.2 |
| 2014/0318363 A1 | 10/2014 | Bennett | |
| 2014/0374461 A1 | 12/2014 | Pedicini et al. | |
| 2015/0122868 A1 | 5/2015 | Campbell | |
| 2015/0129630 A1 | 5/2015 | Matsuno | |
| 2015/0158160 A1 | 6/2015 | Kato | |
| 2015/0174748 A1 | 6/2015 | Furuta et al. | |
| 2015/0217436 A1 | 8/2015 | Yanagihara et al. | |
| 2015/0298308 A1 | 10/2015 | Kato | |
| 2015/0314432 A1 | 11/2015 | Yang et al. | |
| 2015/0336249 A1 * | 11/2015 | Iwata | B25B 21/02 173/1 |
| 2016/0079887 A1 * | 3/2016 | Takano | B25B 21/00 318/431 |
| 2016/0144497 A1 * | 5/2016 | Boehm | B25C 1/008 227/2 |
| 2017/0001291 A1 | 1/2017 | Schnell et al. | |
| 2017/0099025 A1 * | 4/2017 | Ma | B25F 5/00 |
| 2017/0217004 A1 | 8/2017 | Kato | |

FOREIGN PATENT DOCUMENTS

| | | |
|---|---|---|
| JP | H0270980 U | 5/1990 |
| JP | H0396751 A | 4/1991 |
| JP | H666967 U | 9/1994 |
| JP | H08276315 A | 10/1996 |
| JP | 200417206 A | 1/2004 |
| JP | 2004017206 A | 1/2004 |
| JP | 2005028568 A | 2/2005 |
| JP | 2008062360 A | 3/2008 |
| JP | 2008068353 A | 3/2008 |
| JP | 2009006446 A | 1/2009 |
| JP | 200990384 A | 4/2009 |
| JP | 2009172762 A | 8/2009 |
| JP | 2009184075 A | 8/2009 |
| JP | 20105776 A | 1/2010 |
| JP | 2010173044 A | 8/2010 |

(56) References Cited

FOREIGN PATENT DOCUMENTS

| | | | |
|---|---|---|---|
| JP | 2011025362 A | 2/2011 |
| JP | 2011025363 A | 2/2011 |
| JP | 2011056613 A | 3/2011 |
| JP | 2012148346 A | 8/2012 |
| JP | 2012518553 A | 8/2012 |
| JP | 2013233608 A | 11/2013 |
| JP | 2014083601 | 5/2014 |
| WO | 2011010511 A1 | 1/2011 |
| WO | 2013168718 A1 | 11/2013 |
| WO | 2014061807 A1 | 4/2014 |
| WO | 2014069648 A | 5/2014 |

OTHER PUBLICATIONS

Office Action from the Japanese Patent Office dated Jun. 2, 2015 in related Japanese application No. 2012-088843, and translation of substantive portions thereof.
Office Action dated Feb. 27, 2017 in related U.S. Appl. No. 14/391,263 and examined claims 1-20.
Final Office Action from the United States Patent Office dated Jun. 26, 2017 in related U.S. Appl. No. 14/391,263, including examined claims 1-20.
Non-final Office Action from the United States Patent Office dated May 15, 2017 in related U.S. Appl. No. 14/391,283, including examined claims 1-12 and 14-21.
Non-final Office Action dated Sep. 5, 2017 in related U.S. Appl. No. 14/565,993, including examined claims 1-19.
Office Action dated Oct. 2, 2017 in related U.S. Appl. No. 14/399,647.
Notice of Allowance from the United States Patent Office dated Oct. 12, 2017 in related U.S. Appl. No. 14/391,263.
Office Action from the Japanese Patent Office dated Aug. 16, 2017 in related Japanese application No. 2014-084678, and translation of substantive portions thereof.
Office Action from the Japanese Patent Office dated Sep. 21, 2017 in related Japanese application No. 2012-243442, and translation thereof.
Unpublished U.S. Appl. No. 14/399,647.
Unpublished U.S. Appl. No. 14/565,993.
Office Action from the German Patent Office dated Jan. 20, 2016 in counterpart German application No. 10 2015 004 788.4, and translation of substantive portion thereof.
Office Action from the United States Patent Office dated Jul. 23, 2018 in related U.S. Appl. No. 14/440,143.
Office Action from the Japanese Patent Office dated Jun. 27, 2018 in related JP Application No. 2016-12921 and English translation of portions thereof.
Office Action from the Japanese Patent Office dated Jun. 27, 2018 in Trial Appeal No. 2016-12921 of related JP application No. 2012-243442, and English translation of portions thereof.

\* cited by examiner

DRIVING TOOL

CROSS-REFERENCE TO RELATED APPLICATION

The present application claims priority to Japanese patent application serial number 2014-084678 filed on Apr. 16, 2014, the contents of which are incorporated fully herein by reference.

TECHNICAL FIELD

The present invention generally relates to a driving tool that drives a driven article, such as a fastener, into a workpiece.

BACKGROUND ART

A driving tool that drives a driven article (e.g., a fastener) into a workpiece is described in U.S. Pat. No. 8,079,504. In the aforementioned driving tool, compressed air generated by a first piston inside a first cylinder is supplied to a second cylinder. This compressed air causes a second piston to move within the second cylinder and to thereby forcibly strike the driven article, such that the driven article is driven toward and into the workpiece. In addition, this driving tool comprises a sensor that detects the position of the first piston in the operation cycle in which the driven article is driven. Furthermore, in accordance with the position of the first piston detected by the sensor, a control apparatus stops the supply of electric current to a motor and thereby stops the first piston.

SUMMARY OF THE INVENTION

In the above-described known driving tool, a controller circuit for controlling the drive (output) of the motor is provided, and electric current is continuously supplied to the controller circuit. However, in case a driving operation is not being performed by the driving tool, then there is no need to supply the controller circuit with an amount of electric current necessary to drive a driven article. Consequently, in the above-described known driving tool, when the driving tool is not performing a driving operation, unnecessary electric current will be supplied to the controller circuit. As a result, the driving tool will consume an unnecessarily large amount of electric current.

In view of this problem, it is an object of the present teachings to disclose techniques for effectively reducing the electric current (power) consumption of power tools, such the above-described driving tool. By reducing current consumption when no driving operation is being performed, energy savings are achieved. In case the present teachings are applied to a cordless power tool, the battery life will be extended such that the rechargeable battery pack can be recharged less frequently.

According to a first aspect of the present disclosure, a driving tool, such as e.g., a nailer (nail gun) or a stapler, preferably comprises: a motor for driving a driven article (e.g., a fastener, such as a nail, staple or tack); a controller (or control apparatus) that controls the motor; an operating member that is operated by a user when driving the driving tool; and a switch that is switched by the operation performed on the operating member. The controller preferably comprises one or more of: a switch-state detection unit that detects the switch state; a motor-operation-state detection unit that detects the operation state of the motor; a signal-output unit that outputs a signal for controlling the motor; and a motor-drive unit that drives the motor based on the signal output from the signal-output unit. One or more of the switch-state detection unit, the motor-operation-state detection unit, and the signal-output unit optionally may be configured as one or more microcomputers, and the motor-drive unit optionally may be configured as an electric circuit comprising a field effect transistor (FET) or the like, e.g., a pulse-width modulated (PWM) power FET. Furthermore, at least one of the switch-state detection unit, the motor-operation-state detection unit, and the signal-output unit may be configured as an electric circuit respectively comprising, e.g., one or more transistors or the like. The switch state(s) to be detected preferably include(s) the ON state and/or the OFF state of the switch. In addition, at least one of the following optionally may be detected as the state of the motor operation: the driven motor state (i.e. the state in which the motor is currently or momentarily being driven), the stopped motor state (i.e. the state in which the motor is currently or momentarily stopped, and/or the motor-stopped time period (i.e. the time period, e.g., from when the motor stopped rotating or was braked or current thereto was interrupted). The controller is preferably capable of switching between an electric-current supplying mode (also called a motor-drive mode or drive-enabled mode), in which an amount of electric current needed to drive the motor is supplied to electrical components that include the motor-operation-state detection unit, the signal-output unit, and the motor-drive unit in order to drive the motor, and a reduced current mode (also called a low-current mode or sleep mode), in which the electric current supplied to at least one of the motor-operation-state detection unit, the signal-output unit, and the motor-drive unit is reduced or even cut-off. Furthermore, the controller is configured such that it switches to the reduced current mode based on an indicator concerning (indicative or representative of) the motor-operation state. For example, the controller optionally may switch to the reduced current mode based on (i) the stoppage of the motor, which serves as an indicator concerning the operation state of the motor, and (ii) the stopped time period of the motor exceeding a predetermined value.

In the electric-current supplying mode, the electric current needed to drive the motor in order to drive a driven article is supplied to the motor-operation-state detection unit, the signal-output unit, and the motor-drive unit. On the other hand, in the reduced current mode, an electric current (also called a standby current) that is smaller than the electric current supplied to those electrical components in the electric-current supplying mode is supplied to at least one of the motor-operation-state detection unit, the signal-output unit, and the motor-drive unit. In addition or in the alternative, in the reduced current mode, the supply of electric current to at least one of these electrical components may be entirely cut off. Furthermore, in the reduced current mode, the electric current supplied to all of the motor-operation-state detection unit, the signal-output unit, and the motor-drive unit optionally may be reduced and/or cut off.

According to one preferred embodiment of the present disclosure, the mode is preferably switched to the reduced current mode based at least in part on an indicator concerning the motor-operation state (the state of operation of the motor, i.e. driven or idle) for the following reason. For example, the mode could instead be hypothetically switched to the reduced current mode based on whether an operating member, such as the trigger, is currently being operated (pulled). However, if there is a malfunction in the operating member, in a switch operably disposed between the operating member and the motor, or in a related circuit, then it is possible that the mode will not be switched properly to the reduced current mode, e.g. the mode might be inappropriately switched to the reduced current mode even though the motor is still being driven. Consequently, embodiments of the present disclosure, in which the mode is switched to the reduced current mode based at least in part on an indicator concerning the motor-operation state, provide particularly useful and reliable techniques to reduce current consumption in a driving tool by switching to the reduced current mode only when it has been ascertained that the motor is not operating.

According to another aspect of the present disclosure, the controller may be configured such that it switches from the reduced current mode back to the electric-current supplying mode based at least in part on the switch state.

In this aspect, when the user intends to perform a (another) driving operation, the operating member is operated and the switch switches to the ON state. Consequently, the changing or switching of the state of the switch from OFF to ON provides a useful indicator for determining that the mode should be returned from the reduced current mode to the electric-current supplying mode.

According to yet another aspect of the present disclosure, the controller preferably comprises an electric-current-supply control unit. Furthermore, in the reduced current mode, the electric-current-supply control unit is preferably configured to reduce the electric current supplied to the motor-operation-state detection unit, the signal-output unit, and/or the motor-drive unit. Moreover, in the reduced current mode, the electric-current-supply control unit is also preferably configured to reduce the electric current supplied to the switch-state detection unit. Furthermore, the electric-current-supply control unit and the switch-state detection unit are preferably configured such that they are both capable of detecting the switch state, e.g., the switch-state detection unit detects the switch state when a driving operation is performed, and the electric-current-supply control unit detects the switch state when the driving tool is in a sleep state/mode (also called a standby state/mode or reduced current mode). That is, the electric-current-supply control unit and the switch-state detection unit are preferably configured to detect the switch state in different operational states or modes of the driving tool.

In this aspect, when the driving tool is operating in the reduced current mode, the electric current is preferably reduced for all electrical components of the controller other than the electric-current-supply control unit. That is, the electric-current-supply control unit is set to a sleep state/mode, which preferably stops the functions (operation) of some or all of the non-essential electrical components that constitute the controller. Consequently, because only the electric-current-supply control unit of the controller remains operating during the sleep state/mode (reduced current mode), the electric current consumed by the controller is reduced.

According to yet another aspect of the present disclosure, the driving tool preferably comprises: a crank mechanism, which is driven by the motor, and a piston, which is driven by the crank mechanism. In such an embodiment, the driving tool is configured such that the driven article is driven by the driving (impact) force of the piston. Furthermore, the motor-operation-state detection unit preferably comprises a crank-angle detection unit that detects the crank angle of the crank mechanism or the motor. In such an embodiment, the controller preferably detects or calculates the motor-operation state based at least in part on the detection result of the crank-angle detection unit. Furthermore, the controller preferably reduces the electric current supplied to the crank-angle detection unit, which serves as the motor-operation-state detection unit, in the reduced current mode.

In this aspect, the position of the crankshaft, and also the change in the position of the crankshaft, are calculated using the crank angle detected (calculated) by the crank-angle detection unit. If the crank angle is continuously detected or detected in frequent intervals, the controller can detect whether the motor is currently being driven, or whether the motor has stopped; furthermore the controller can calculate the time period starting from when the motor stopped (i.e. a motor-stopped time period). For example, if the amount of change in the crank angle per unit of time is determined or calculated to be zero, then it is determined that the crankshaft is stopped, and therefore that the motor is stopped. By utilizing this information, the controller may be configured to switch the mode to the reduced current mode when the motor is stopped and/or when the motor-stopped time period exceeds a prescribed time period, wherein one or both of these two conditions may serve as a motor-operation state according to the present disclosure.

According to yet another aspect of the present disclosure, the operating member may preferably include a trigger, which is manually operable by the user, and a contact arm, which is operated when the user presses the driving tool (i.e. the contact arm or driver guide) against a workpiece. In addition, the switch may preferably include a trigger switch, which is switched by movement of the trigger, and a contact-arm switch, which is switched by movement of the contact arm. In such an embodiment, the motor is preferably driven (only) when both the trigger switch and the contact-arm switch are simultaneously in the ON state. Furthermore, the controller preferably calculates the motor-stopped time period, which serves as an indicator concerning the motor-operation state. For example, the controller may calculate the motor-stopped time period based at least in part on the detection result of the crank-angle detection unit. Furthermore, the controller may define a starting point of the motor-stopped time period based on a signal output by the signal-output unit. That is, the controller may set (define) the point in time when the output of the output signal from the signal-output unit for driving the motor has stopped as the starting point of the motor-stopped time period; in the alternative, the controller may set (define) the point in time when the stop signal from the signal-output unit for braking the rotation of the motor is output or the point in time when the output of the stop signal is stopped as the starting point of the motor-stopped time. Furthermore, the controller preferably switches to the reduced current mode if both the trigger switch and the contact-arm switch are in the OFF state when the motor-stopped time period exceeds a prescribed (first) threshold value (time period). In addition, the controller is preferably configured to also switch to the reduced current mode if the motor-stopped time period exceeds a second threshold value (time period), which is longer than the prescribed (first) threshold value, even if both the trigger switch and the contact-arm switch are not currently or momentarily in the OFF state when the second threshold value (time period) was exceeded.

In this aspect, the mode switches to the reduced current mode based on the state(s) of the trigger switch and the contact-arm switch, which are respectively operatively coupled to the trigger and the contact arm, and based on the motor-stopped time period. In particular, if either the trigger switch or the contact-arm switch is in the ON state, then the driving tool is in the state in which the user is operating the trigger or the contact arm, respectively. In this state, it is possible that the user intends to immediately (soon afterward) drive a driven article. On the other hand, if the trigger switch and the contact-arm switch are both in the OFF state, then the driving tool is the state in which the user is not operating the trigger or the contact arm. In this state, there is ample time until the user begins the next driving operation. Consequently, by putting the driving tool into the reduced current mode in this latter state, the driving tool is efficiently and advantageously controlled such that it reflects the user's current or momentary intention whether or not to perform a driving operation. In particular, when neither the trigger nor contact arm is being operated, there is ample time until the next driving operation is started to power up the controller, so that the electric current consumed by the driving tool may be efficiently reduced by switching to the reduced current mode in this state.

According to yet another aspect of the present disclosure, the operating member may again preferably include a trigger, which is manually operable by the user, and a contact arm, which is operated when the user presses the driving tool (i.e. the contact arm or driver guide) against a workpiece. In addition, the switch may again preferably include a trigger switch, which is switched by movement of the trigger, and a contact-arm switch, which is switched by movement of the contact arm. In such an embodiment, the motor is preferably driven when the trigger switch and the contact-arm switch are both simultaneously in the ON state. Furthermore, the controller preferably calculates the motor-stopped time period, which serves as an indicator concerning the motor-operation state. For example, the controller may calculate the motor-stopped time period based at least in part on the detection result of the crank-angle detection unit. Furthermore, the controller may define a starting point of the motor-stopped time period based on a signal output by the signal-output unit. That is, the controller may set (define), as the starting point of the motor-stopped time period, the point in time when the output of the output signal from the signal-output unit for driving the motor has stopped; in the alternative, the controller may set (define), as the starting point of the motor-stopped time, the point in time when the stop signal from the signal-output unit for braking the rotation of the motor is output or the point in time when the output of the stop signal is stopped. In addition, the controller is preferably configured to switch to the reduced current mode if the stopped time period exceeds a prescribed second threshold value (time period). That is, even if one or both of the trigger switch and the contact-arm switch is/are in the ON state when the motor-stopped time period exceeds the second threshold value (time period), the driving tool may be switched to the reduced current mode.

According to a further development of the preceding aspect, the controller may be configured such that it does not switch from the reduced current mode back to the electric-current supplying mode unless the OFF states of both the trigger switch and the contact-arm switch are detected after the reduced current mode has been entered (started).

In this aspect, when the motor-stopped time period exceeds the second threshold value, the mode switches to the reduced current mode regardless of the state of the trigger switch and the contact-arm switch (i.e. one or both of these switches may have been in the ON state when the reduced current mode was entered). Accordingly, prior to switching from the reduced current mode back to the electric-current supplying mode, it is advantageous to first detect that both the trigger switch and the contact-arm switch are in (have returned to) the OFF state, which has the beneficial effect of preventing an unintentional driving of a driven article at the time when the mode is switched (switches) to the electric-current supplying mode. Thereby, the operation of the driving tool is made safer.

According to yet another aspect of the present disclosure, the driving tool may optionally comprise: an electrical device, and an electrical-device switch, which switches the driving and stopping (activation and deactivation) of the electrical device. For example, such an electrical device preferably may be or may include an information display apparatus (display), e.g., an LCD or LED display, that displays information, e.g., concerning the operational state of the driving tool, an illuminator (light source, such as one or more LEDs or incandescent lights) that illuminates the work area, or the like. In such an embodiment, the controller preferably maintains the driving tool in the electric-current supplying mode (motor drive-enabled mode) while the electrical-device switch is in the ON state, i.e. when the electrical device is being driven (energized). In other words, the controller preferably does not switch the mode to the reduced current mode while the electrical device is being driven. Furthermore, in such an embodiment, the driving tool preferably further comprises an electrical-device switch-state detection unit that detects the operational state of the electrical-device switch. In this case, the driving tool and/or its controller may be configured such that the electric current supplied to the electrical-device switch-state detection unit is reduced or cut off in the reduced current mode. Furthermore, the controller may be configured such that it switches from the reduced current mode to the electric-current supplying mode if the electrical-device switch switches from the OFF state, in which the electrical device is stopped (idle or not energized), to the ON state, in which the electrical device is driven (energized).

In this aspect, the controller preferably does not switch the mode to the reduced current mode while the electrical device is being driven for the following reason. When the electrical device is being driven (energized), the driving tool is in an operational state in which there is a high likelihood that the user will soon perform a driving operation. In this state, the electric-current supplying mode (motor drive-enabled mode) is maintained, and thereby the user can smoothly (quickly) perform subsequent driving operations without having to wait for the controller to be powered or started up again from the reduced current mode. In addition, if the electrical-device switch is operated by the user and the electrical device is being driven, then the controller switches to the electric-current supplying mode because it has become highly likely that the user intends to promptly perform a (another) driving operation. Consequently, by switching the mode from the reduced current mode to the electric-current supplying mode when the electrical-device switch switches from the OFF state to the ON state, even if neither of the trigger or contact arm have been operated (i.e. put into the ON state), the controller begins to power up again so that the user can smoothly (quickly) perform subsequent driving operations as soon as the trigger and contact arm are operated again.

According to another aspect of the present disclosure, a method of operating an electro-pneumatic driving tool to drive a fastener into a workpiece preferably comprises placing the driving tool into a sleep mode, whereby current consumption is reduced, when it is determined that the motor has stopped for a predetermined period of time and then placing the driving tool into an active mode when an indicator of possible intended use is detected. Additional embodiments and details of this method follow from the description above and below.

Additional objects, features, embodiments, effects and advantages of the present disclosure will become apparent after reading the following detailed description and claims in view of the appended drawings.

DETAILED DESCRIPTION OF THE EMBODIMENTS

A representative embodiment of the present disclosure will be explained below, with reference to FIG. 1 through FIG. 8. The present embodiment is explained using an electro-pneumatic nailer as one non-limiting example of a driving tool according to the present disclosure. As shown in the overall views of FIG. 1 and FIG. 2, a nailer (nail gun) 100 may principally comprise a main-body housing 101 and a magazine 105. The main-body housing 101 is defined as a tool main body and forms an outer wall (shell) of the nailer 100. The magazine 105 is loaded with nails (not illustrated), which serve as driven articles that are to be driven into a workpiece. The main-body housing 101 is formed by joining together a pair of substantially symmetrical left and right housings. The main-body housing 101 integrally comprises a handle (handle part) 103, a driving-mechanism housing part 101A, a compression-apparatus housing part 101B, and a motor-housing part 101C.

Figure 1:
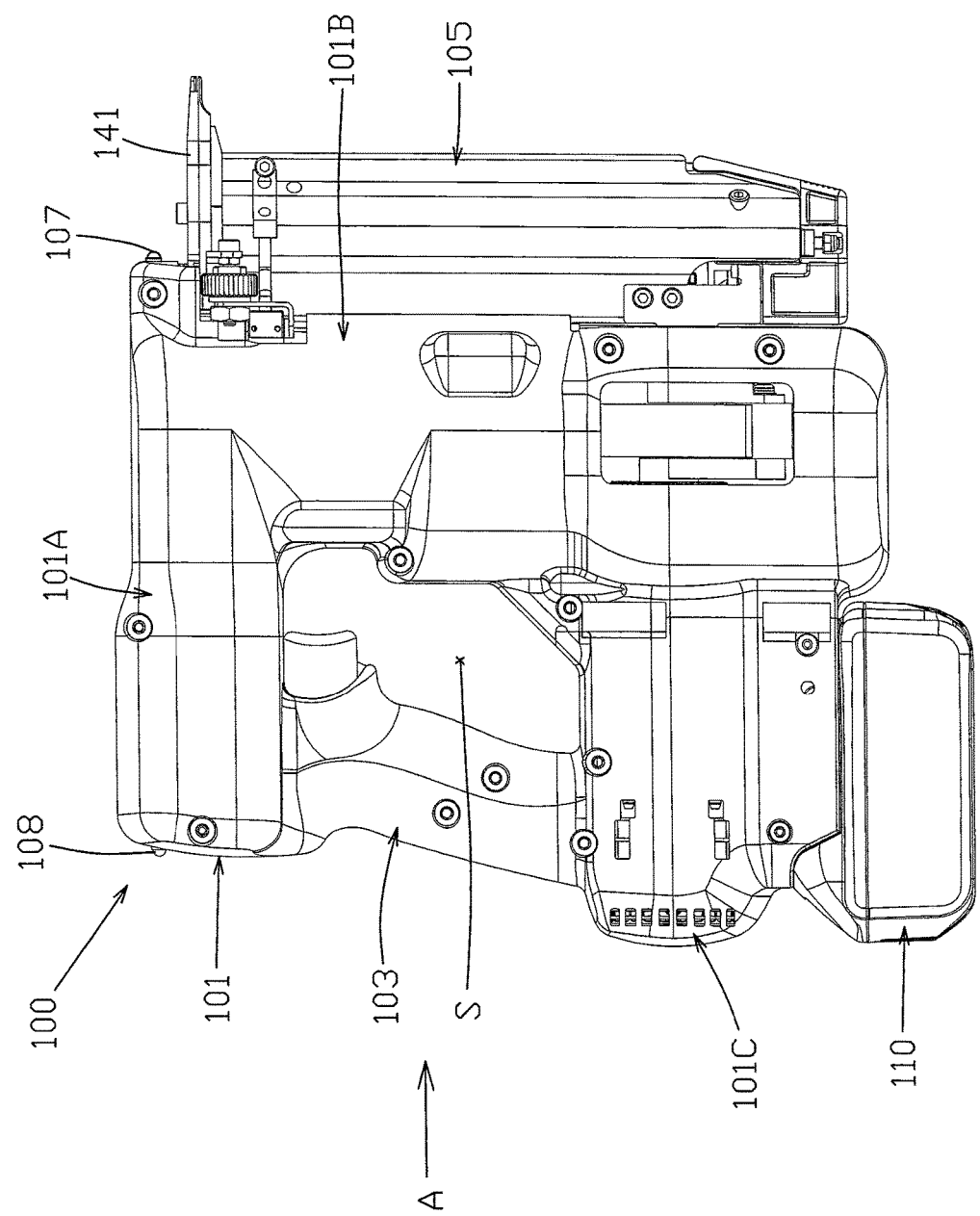
FIG. 1 is an external view that shows the overall configuration (appearance) of an electro-pneumatic nailer according to a representative embodiment of the present disclosure.
Figure 2:
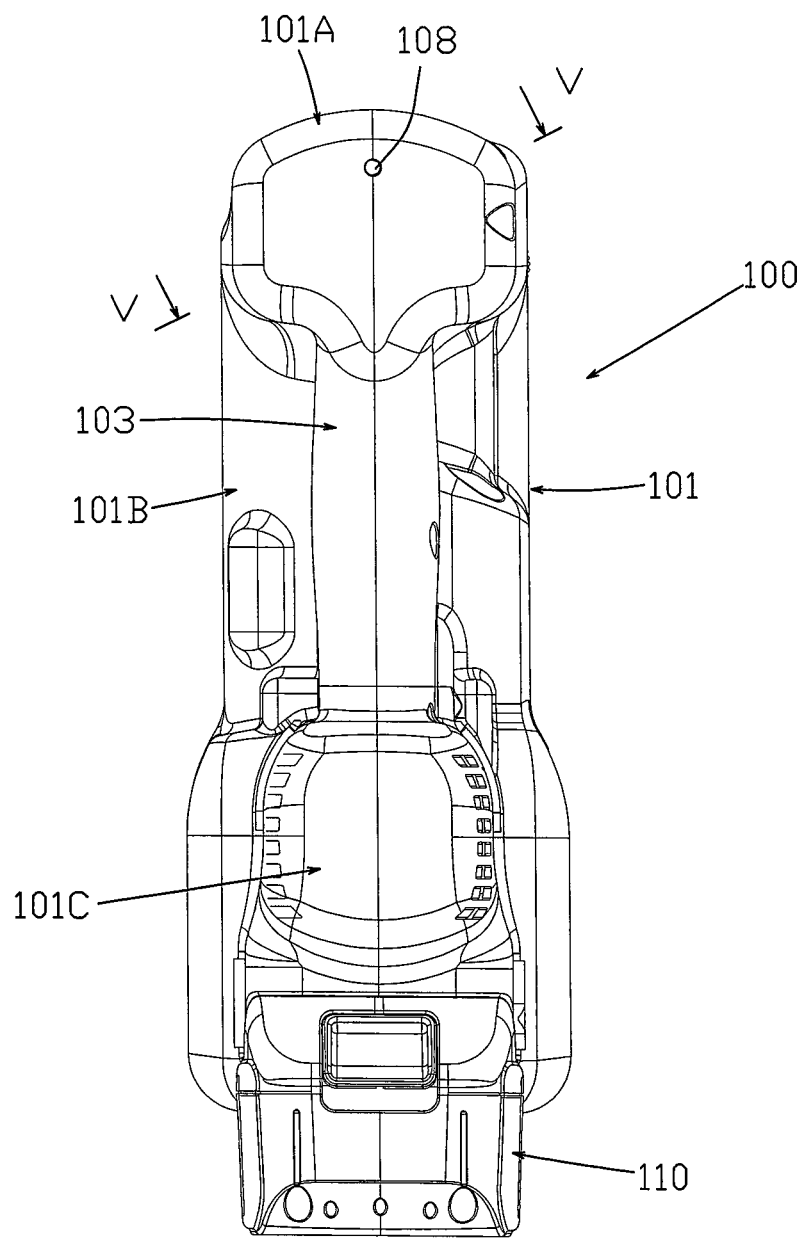
FIG. 2 is a view taken in the direction of arrow A shown in FIG. 1.

The handle part 103, the driving-mechanism housing part 101A, the compression-apparatus housing part 101B, and the motor-housing part 101C are disposed such that, in a side view of the nailer 100 (as shown in FIG. 1), they generally form a quadrangle, e.g., a rectangle. The handle part 103 is an elongated member that extends with a prescribed length, one end side of which is joined (connected) to the driving-mechanism housing part 101A and the other end side of which is joined (connected) to the motor-housing part 101C. Moreover, the compression-apparatus housing part 101B extends substantially parallel to the handle part 103, and one end side of the compression-apparatus housing part 101B is joined (connected) to the driving-mechanism housing part 101A and the other end side is joined (connected) to the motor-housing part 101C. Consequently, in the nailer 100, a (hollow) space S is formed that is surrounded by the handle part 103, the driving-mechanism housing part 101A, the compression-apparatus housing part 101B, and the motor-housing part 101C.

As shown in FIG. 1, a driver guide 141 and an LED 107 are disposed at a tip part (the right end in FIG. 1) of the nailer 100. The rightward direction in FIG. 1 is the nail driving direction. Furthermore, for the sake of convenience of explanation, the tip side (the right side in FIG. 1) of the nailer 100 will be referred to as the "front side", and the side opposite the tip side (the left side in FIG. 1) will be referred to as the "rear side". In addition, the side of the nailer 100 (the upper side in FIG. 1) to which the driving-mechanism housing part 101A of the handle part 103 is joined will be called the "upper side", and the side of the nailer 100 (the lower side in FIG. 1) to which the motor-housing part 101C of the handle part 103 is joined will be called the "lower side".

Figure 3:
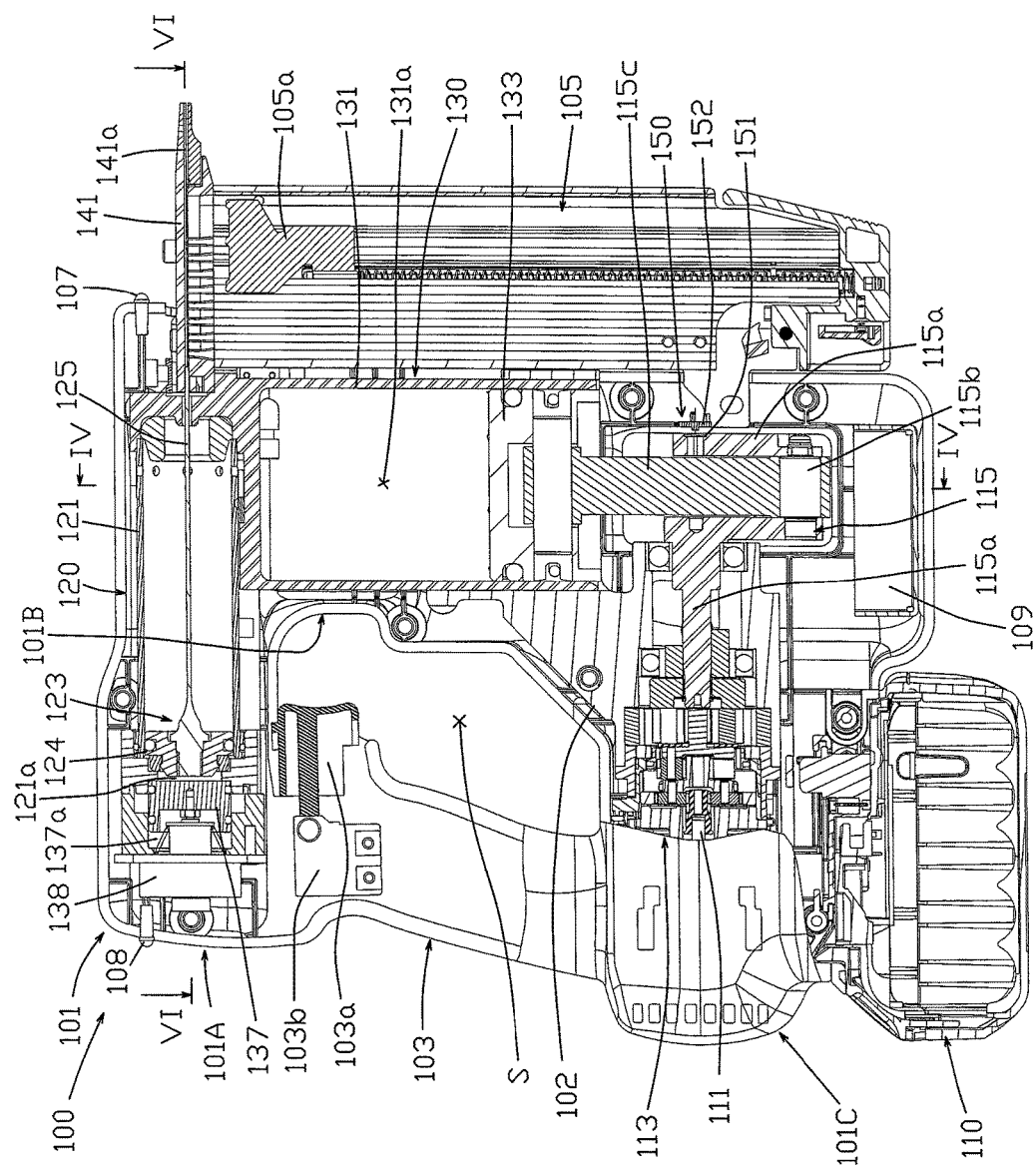
FIG. 3 is a cross-sectional view that shows the overall configuration of an internal mechanism of the nailer.

As shown in FIG. 3, the driving-mechanism housing part 101A houses a nail-driving mechanism 120. The nail-driving mechanism 120 principally comprises a driving cylinder 121 and a driving piston 123.

The driving piston 123 that strikes/drives ("hammers") the nails (fasteners) is housed within the driving cylinder 121 so as to be reciprocally slidable in the front-rear directions (the longitudinal axis direction of the driving cylinder 121). The driving piston 123 comprises a piston-main-body part 124, which is slidably housed within (in sliding contact with) the driving cylinder 121, and an elongated driver 125, which is configured to strike and (hammer) drive the nails, is integrally provided with the piston-main-body part 124 and extends forward therefrom. The piston-main-body part 124 and the elongated driver 125 are configured such that they are capable of linearly moving in the forward direction (towards the front side) in the longitudinal axis direction of the driving cylinder 121 by supplying compressed air into a cylinder chamber 121a. The compressed air causes the elongated driver 125 to move forward within a driving passage 141a of the driver guide 141 to drive a nail. The cylinder chamber 121a is formed (defined) as a space that is surrounded by an inner wall surface of the driving cylinder 121 and a rear side surface of the piston-main-body part 124. The driver guide 141 is disposed at a tip part of the driving cylinder 121 and comprises the driving passage 141a, which has a nail ejection port (tool nozzle) at its tip. The elongated driver 125 serves as one representative example of a "tool" according to the present disclosure.

As shown in FIG. 1, the magazine 105 is disposed on the tip (front) side of the main-body housing 101, i.e., forward of the compression-apparatus housing part 101B. The magazine 105 is operably coupled to the driver guide 141 and supplies the nails to the driving passage 141a. Furthermore, as shown in FIG. 3, the magazine 105 is provided with a pusher plate 105a that pushes (urges) the nails in a supplying direction (upward in FIG. 3). Thus, the nails are supplied, one nail at a time, by the pusher plate 105a to the driving passage 141a of the driver guide 141 from a direction that intersects (e.g., is orthogonal to) the driving direction.

As shown in FIG. 3, the compression-apparatus housing part 101B houses a compression apparatus (compressor or compressed air generator) 130. The compression apparatus 130 principally comprises a compression cylinder 131, a compression (reciprocally movable) piston 133, and a crank mechanism 115. The compression piston 133 is disposed such that it is capable of reciprocally sliding in the up-down directions (as viewed in FIG. 3), within the compression cylinder 131.

The compression cylinder 131 is disposed alongside (parallel to) the magazine 105; an upper-end side of the compression cylinder 131 is joined (coupled) to a front-end part of the driving cylinder 121. Furthermore, the compression piston 133 is disposed such that it reciprocally slides in the up-down directions alongside (parallel to) the magazine 105. Thus, the operation (reciprocal movement) direction of the compression piston 133 is substantially orthogonal to the operation (reciprocal movement) direction of the driving piston 123. When the compression piston 133 slides in the up-down directions, the volume of a compression chamber 131a, which is an internal space of the compression cylinder 131, changes. That is, the movement of the compression piston 133 toward the upward side, which reduces the volume of the compression chamber 131a, causes the air in the compression chamber 131a to be compressed. The compression chamber 131a is formed (defined) on an upper part side that is proximate to the driving cylinder 121. In addition, the compression cylinder 131 comprises a not-shown air release valve (atmosphere open valve) configured to selectively open the compression chamber 131a to the atmosphere. The air release valve (atmosphere open valve) is held in a closed state during a driving operation and switches to an open state at times other than during the driving operation.

As shown in FIG. 3, the motor-housing part 101C houses an electric motor 111. The electric motor 111 is disposed such that its rotational axis is preferably at least substantially parallel to the longitudinal axis of the driving cylinder 121. Accordingly, the rotational axis of the electric motor 111 is preferably at least substantially orthogonal to the operation (reciprocal movement) direction of the compression piston 133. Furthermore, a battery-mounting area is formed (defined) on a lower-part side of the motor-housing part 101C, and a rechargeable battery pack 110 that supplies electric current (power) to the electric motor 111 is detachably mounted to the battery-mounting area.

As shown in FIG. 3, the rotation (rotational speed or rotary output) of the electric motor 111 is reduced by a planetary-gear-type, speed-reducing mechanism 113, after which the rotation (rotational energy/movement) is transmitted to the crank mechanism 115. Furthermore, the rotation (rotary output) of the electric motor 111 is converted into reciprocating linear motion by the crank mechanism 115 and then is transmitted to (drives) the compression piston 133. The speed-reducing mechanism 113 and the crank mechanism 115 are housed within an inner-side housing 102, which is disposed over a rearward area of the compression-apparatus housing part 101B and a forward area of the motor-housing part 101C.

The crank mechanism 115 principally comprises a crankshaft 115a, an eccentric pin 115b, and a connecting rod 115c. The crankshaft 115a is joined to and rotationally driven by the planetary-gear-type, speed-reducing mechanism 113. The eccentric pin 115b is provided at a position that is offset from the center of rotation of the crankshaft 115a. One end of the connecting rod 115c is pivotally joined (connected) to the eccentric pin 115b, and the other end of the connecting rod 115c is pivotally joined (connected) to the compression piston 133. The crank mechanism 115 is disposed below the compression cylinder 131. Based on the above-described configuration, the compression apparatus 130 is configured as a reciprocating-type compression apparatus and principally comprises the compression cylinder 131, the compression piston 133, and the crank mechanism 115. The crank mechanism 115 and the electric motor 111 serve as representative examples of a "crank mechanism" and a "motor," respectively, in the present disclosure.

Figure 9:
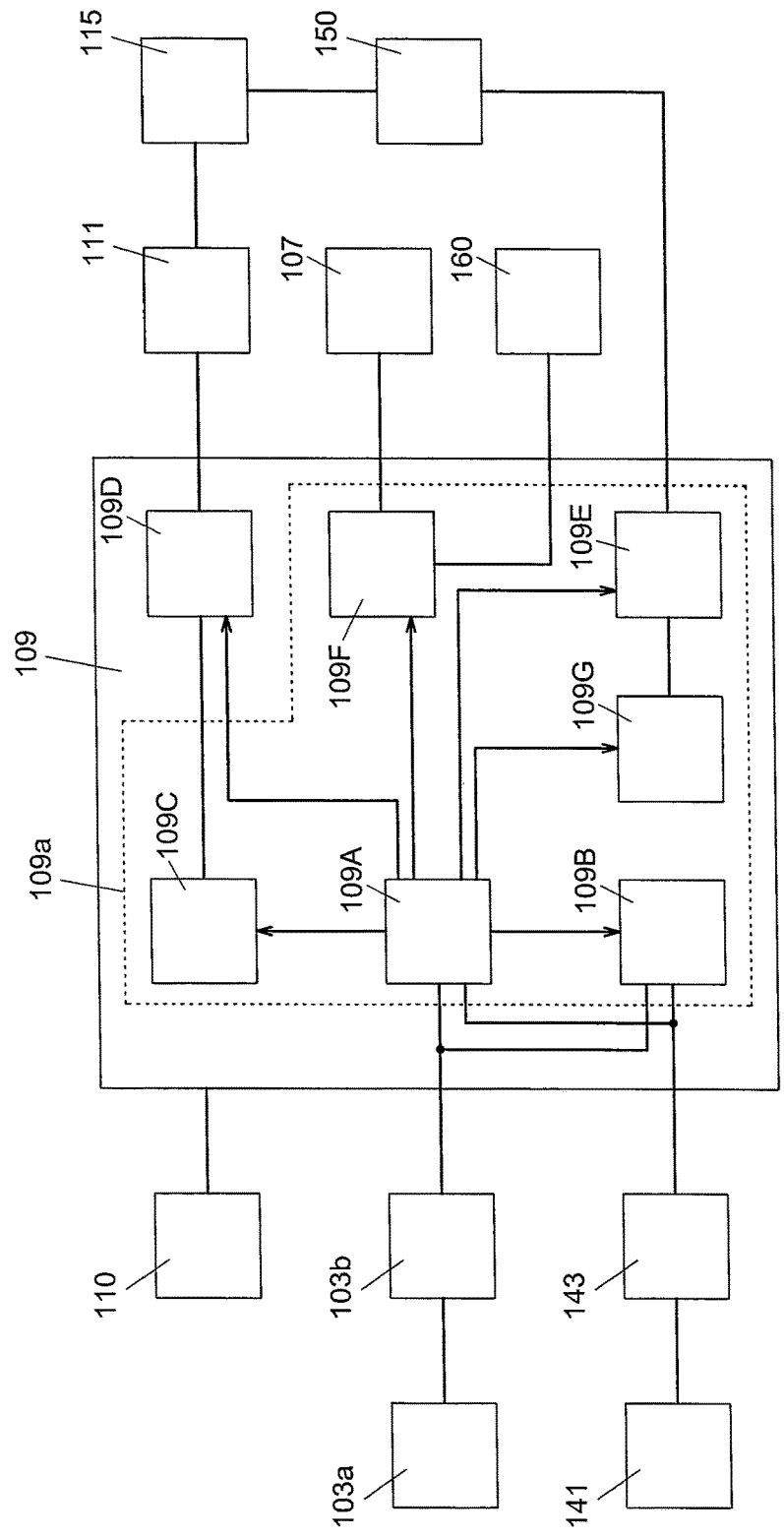
FIG. 9 is a block diagram that shows a representative control system for operating the nailer.

As shown in FIG. 3, the handle part 103 is provided with a trigger 103a and a trigger switch 103b. In addition, a control apparatus (control unit) 109 is disposed below the crank mechanism 115. As shown in FIG. 9, the control apparatus 109 is electrically connected to a contact-arm switch 143, the trigger switch 103b, the electric motor 111, a magnetic sensor 150, an LED 107, and the battery pack 110. Furthermore, the electric motor 111 is controlled by the control apparatus 109 in accordance with the operation of the trigger 103a, which is provided on the handle part 103, and the operation of the driver guide 141, which is provided at the tip area of the main-body housing 101, as will be further described below.

As shown in FIG. 9, the control apparatus 109 principally comprises a controller 109a and a motor-control unit 109D. The controller 109a comprises a sleep-control unit 109A, a switch-detection unit 109B, a drive-signal output unit 109C, a crank-angle calculation unit 109E, an LED-control unit 109F, and a timer 109G. The controller 109a principally comprises a printed circuit board, a central processing unit (CPU) disposed on the printed circuit board, read only memory (ROM), in which various programs, data, and the like for controlling each of the electrical components (structural elements) 109A-109G are stored, and random access memory (RAM) that temporarily stores data and the like processed by the CPU. The controller 109a is configured as a microcomputer. Furthermore, one or more of the sleep-control unit 109A, the switch-detection unit 109B, the drive-signal output unit 109C, the crank-angle calculation unit 109E, the LED-control unit 109F, and the timer 109G constituting the controller 109a may be configured as part of the microcomputer, e.g., as software components executed by one or more microprocessors, or as discrete or separate hardware, in which various digital, analog and/or mixed circuits that include one or more arithmetic calculating circuits are combined. The control apparatus 109 serves as a representative example of a "controller" in the present disclosure.

The sleep-control unit 109A is (electrically) connected to the trigger switch 103b and to the contact-arm switch 143. Similarly, the switch-detection unit 109B is also (electrically) connected to the trigger switch 103b and to the contact-arm switch 143. The sleep-control unit 109A and the switch-detection unit 109B detect at least the ON/OFF states of the trigger switch 103b and the contact-arm switch 143, respectively. The switch-detection unit 109B serves as a representative example of a "switch-state detection unit" in the present disclosure. In some aspects of the present teachings, the switch-detection unit 109B optionally may also detect the amount of movement (squeezed amount) of the trigger 103a in order to generate a variable signal for variably controlling the output of the electric motor 111.

Figure 6:
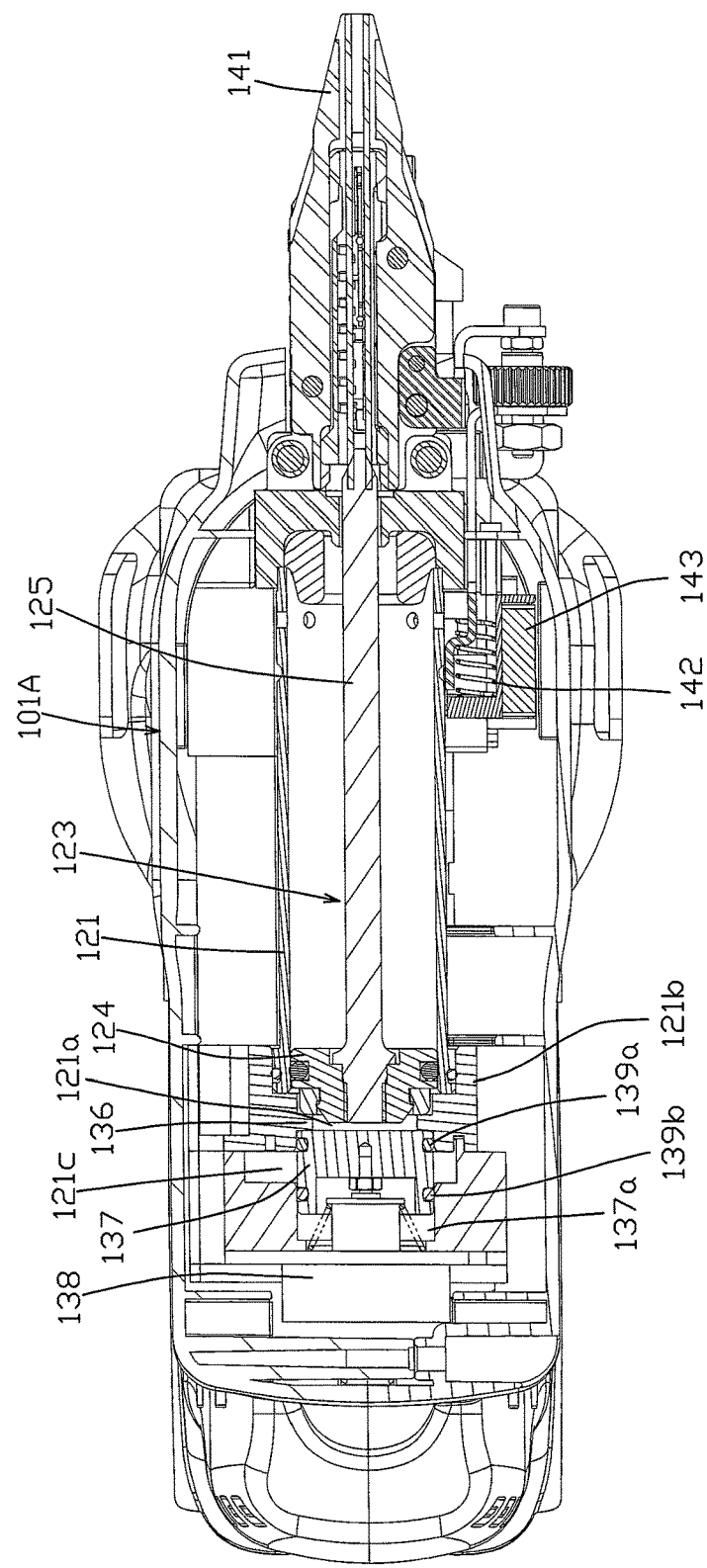
FIG. 6 is a cross-sectional view taken along line VI-VI shown in FIG. 3 and shows the state in which a valve is closed.

The trigger switch 103b changes to the ON state when the user pulls or squeezes the trigger 103a and changes to the OFF state when the user ceases the pulling of (releases) the trigger 103a. Furthermore, the trigger 103a is disposed such that it protrudes toward (projects into) the (hollow) space S surrounded by the handle part 103, the driving-mechanism housing part 101A, the compression-apparatus housing part 101B, and the motor-housing part 101C. The driver guide 141 is configured to serve as a contact arm and is disposed at a tip area of the main-body housing 101 such that it is capable of moving in the front-rear directions of the nailer 100. As shown in FIG. 6, the driver guide 141 is biased (urged) forwardly by a biasing (compression) spring 142. Furthermore, when the driver guide 141 is positioned (moves) forward, the contact-arm switch 143 changes to the OFF state; when the driver guide 141 is moved (relative to the magazine 105) towards the main-body housing 101 side, the contact-arm switch 143 changes to the ON state. The trigger 103a and/or the driver guide 141 serve as representative examples of an "operating member" in the present disclosure. In addition, the trigger switch 103b and the contact-arm switch 143 serve as representative examples of a "switch" in the present disclosure.

When the trigger switch 103b and the contact-arm switch 143 have both switched to the ON state, then the drive-signal output unit 109C generates a drive signal for driving the electric motor 111 and outputs the drive signal to the motor-control unit 109D. The motor-control unit 109D drives the electric motor 111 based on the drive signal. Thereby, the electric motor 111 is driven when both the trigger switch 103b and the contact-arm switch 143 have been switched to the ON state and stops when either is switched to the OFF state. The drive-signal output unit 109C and the motor-control unit 109D serve as representative examples of a "signal-output unit" and a "motor-drive unit," respectively, in the present disclosure.

Figure 5:
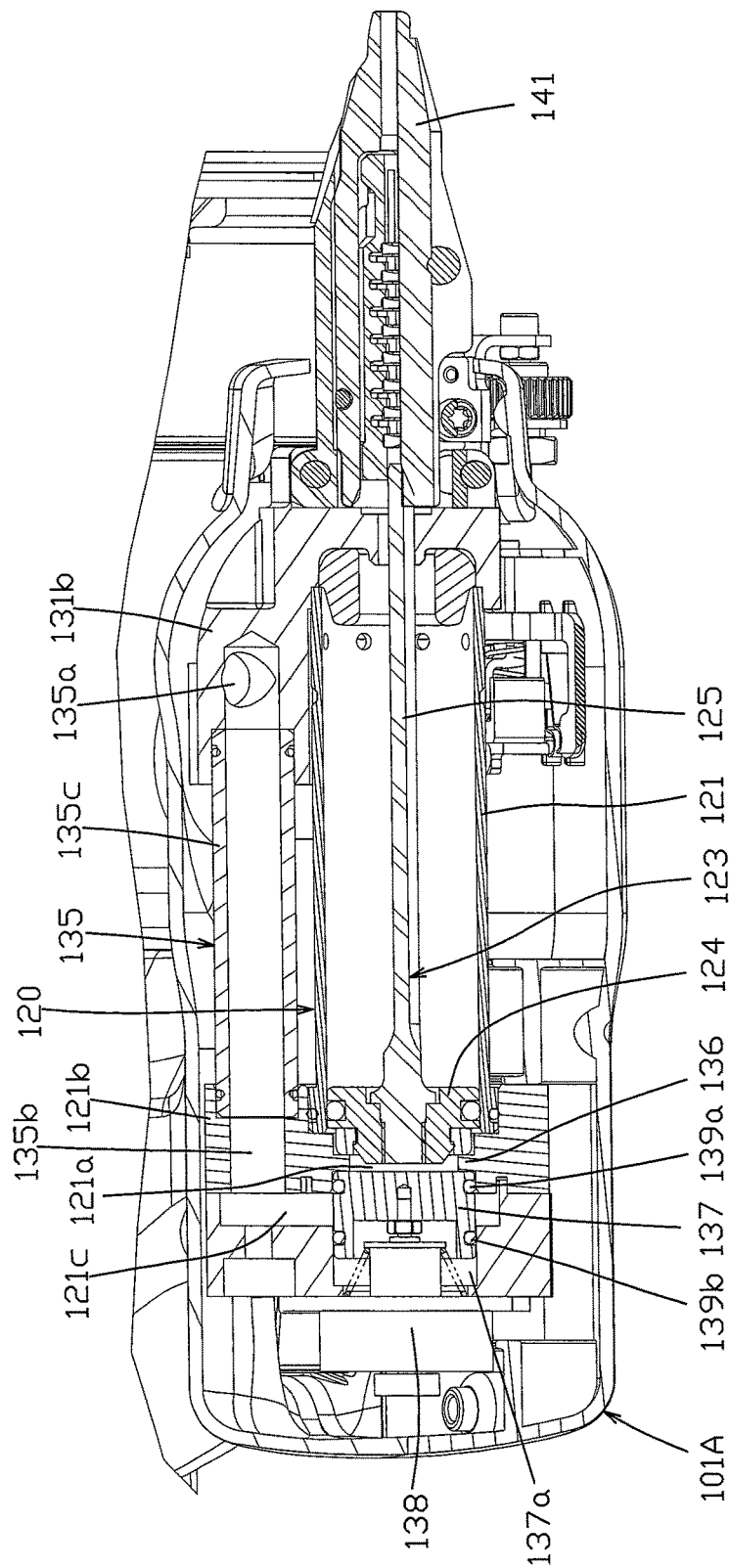
FIG. 5 is a cross-sectional view taken along line V-V shown in FIG. 2.

As shown in FIG. 5, the nailer 100 has an air passage 135 and a valve chamber 137a that provide communication between the compression chamber 131a of the compression cylinder 131 and the cylinder chamber 121a of the driving cylinder 121.

Figure 4:
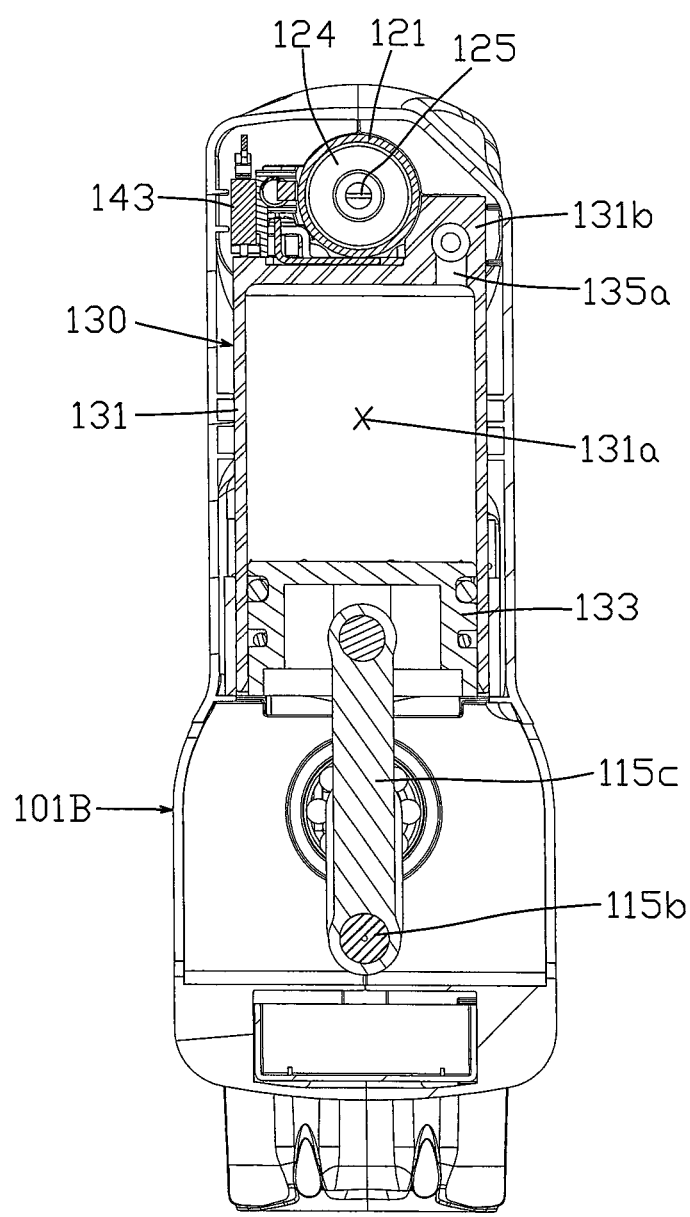
FIG. 4 is a cross-sectional view taken along line IV-IV shown in FIG. 3.

As shown in FIG. 5, the air passage 135 principally comprises a (first) communication port 135a, a (second) communication port 135b and a communication path (tube) 135c. An annular groove 121c and the valve chamber 137a are in fluid communication with the air passage 135. As shown in FIG. 4, the (first) communication port 135a is formed (defined) in a cylinder head 131b of the compression cylinder 131. The (second) communication port 135a is proximate to and communicates with the compression chamber 131a. In addition, as shown in FIG. 5, the (second) communication port 135b is formed (defined) in a cylinder head 121b of the driving cylinder 121. The (second) communication port 135b communicates with the valve chamber 137a. The communication path 135c provides communication between the (first) communication port 135a and the (second) communication port 135b. The communication path 135c is formed as (defined by) a pipe-shaped (hollow) member and extends linearly (straight) in the front-rear direction alongside (parallel to) the driving cylinder 121.

As shown in FIG. 5, the (second) communication port 135b is proximate to and communicates with the annular groove 121c, which is formed (defined) in a circumferential surface of the valve chamber 137a. Thus, the annular groove 121c is proximate to and communicates with the valve chamber 137a. Furthermore, the valve chamber 137a communicates with the cylinder chamber 121a. In addition, the (second) communication port 135b communicates with the cylinder chamber 121a via the annular groove 121c and the valve chamber 137a. A solenoid valve 137, which opens and closes the air passage 135, is housed in the valve chamber 137a.

The solenoid valve 137 is a cylindrical member (e.g., it has a cylindrical shape, preferably a circular cylindrical shape) and has a diameter that is substantially the same as (only slightly smaller than) the diameter of the piston-main-body part 124 of the driving piston 123. The solenoid valve 137 is disposed within the valve chamber 137a and is capable of reciprocally moving in the front-rear directions. An electromagnet 138 is disposed rearward of the solenoid valve 137. The control apparatus 109 moves the solenoid valve 137 in the front-rear directions by switching the supply of electrical current and the cut-off of the supply of electrical current to the electromagnet 138. Two O-rings 139a, 139b are disposed on the outer circumference of the solenoid valve 137 at a prescribed spacing in the front-rear direction, as will be further described below. The solenoid valve 137 opens and closes the annular groove 121c by moving rearward and forward, respectively.

Figure 7:
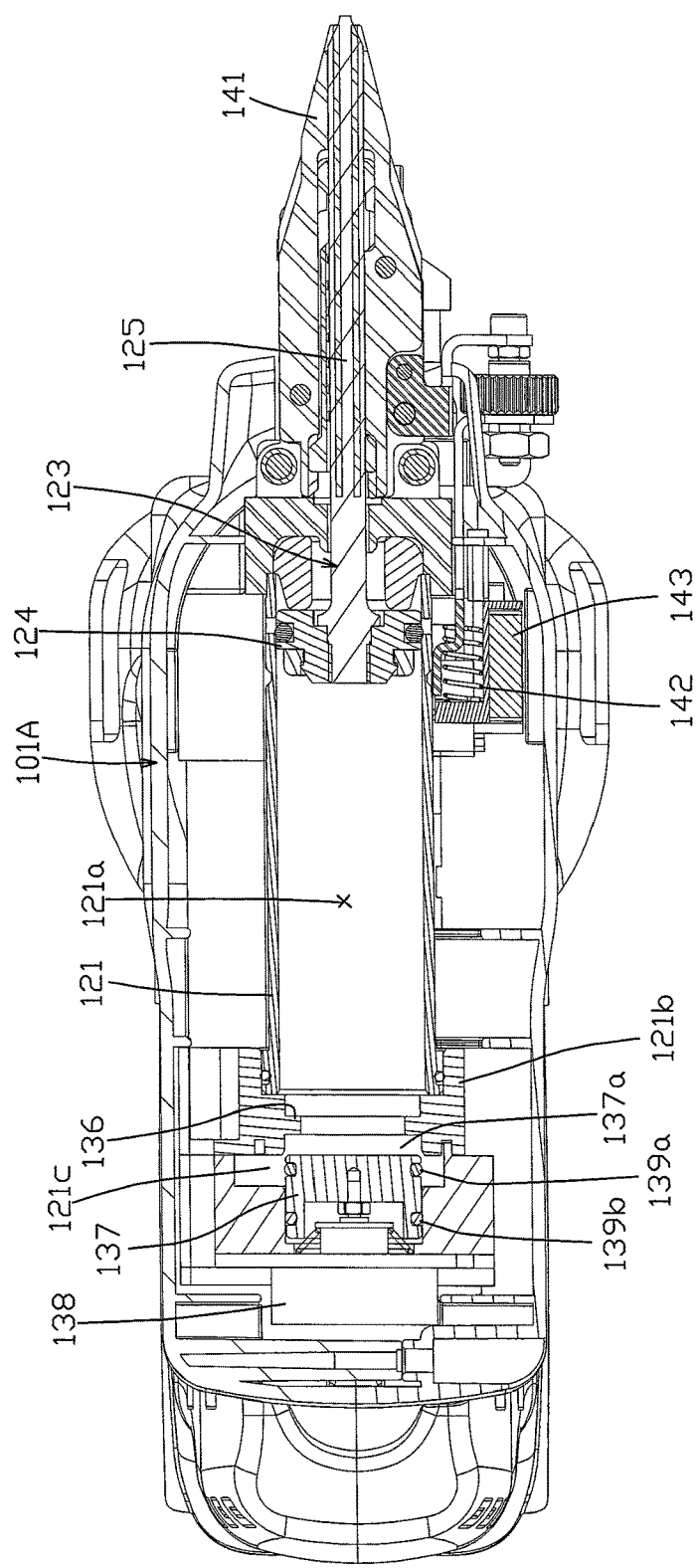
FIG. 7 shows a nailing state in which the valve in FIG. 6 has opened and the driving (second) piston has moved forward.

More specifically, as shown in FIG. 6, the front side O-ring 139a cuts off (blocks) the (fluid) communication between the annular groove 121c and the cylinder chamber 121a by making contact with the cylinder head 121b, which forms part of the inner wall surface of the valve chamber 137a forward of the annular groove 121c. Moreover, as shown in FIG. 7, when the O-ring 139a moves into the range (span) of the annular groove 121c, the annular groove 121c (fluidly) communicates with the cylinder chamber 121a. Furthermore, the rear side O-ring 139b is designed to prevent the compressed air from leaking out of the (second) communication port 135b and does not contribute to the opening or closing of the annular groove 121c. Thus, the solenoid valve 137, which opens and closes the air passage 135, is provided on the side of the air passage 135 on which the cylinder chamber 121a of the driving cylinder 121 is (fluidly) connected.

As shown in FIG. 6, the solenoid valve 137 is disposed (biased or urged) forward by the electromagnet 138 such that the annular groove 121c is normally closed (sealed or blocked). In addition, a stopper 136 is disposed forward of the solenoid valve 137 and limits the forward movement of the solenoid valve 137. The stopper 136 is formed by a flange-shaped member that protrudes inwardly in the radial direction inside the cylinder chamber 121a. Furthermore, the stopper 136 also defines or limits the rearmost position of the rearward movement of the driving piston 123.

In addition, as shown in FIG. 3, the nailer 100 comprises the magnetic sensor 150. The magnetic sensor 150 principally comprises a magnet 151 and a Hall-effect device 152. The magnet 151 is preferably provided on the crankshaft 115a. Moreover, the Hall-effect device 152 is preferably provided at a position along the compression-apparatus housing part 101B opposing the magnet 151. Furthermore, in view of the fact that the magnetic flux density sensed by the Hall-effect device 152 varies with the (rotational) position of the magnet 151, the magnetic sensor 150 detects the output voltage of the Hall-effect device 152, which corresponds to the magnetic flux density. In the magnetic sensor 150, a plurality of Hall-effect devices 152 may be provided on the compressing-apparatus housing part 101B in the rotational direction of the crankshaft 115a for precisely detecting the position of the crankshaft 115a. The magnetic sensor 150 is connected to the crank-angle calculation unit 109E. Furthermore, the crank-angle calculation unit 109E calculates the crank angle as the position of the crankshaft 115a based on the detection result of the magnetic sensor 150. That is, the control apparatus 109 measures the (rotational) position of the crankshaft 115a. Thereby, the position of the compression piston 133, which is connected to the crankshaft 115a, is detected. The crank-angle calculation unit 109E serves as a representative example of a "motor-operation-state detection unit" and a "crank-angle detection unit" in the present disclosure.

Next, the operation of and a representative method of using the nailer 100 will be explained. As shown in FIG. 3, the "initial position" of the nailer 100 is defined as the state in which the driving piston 123 is positioned at the rear-end (its rearmost) position (the left-end position in FIG. 3) and the compression piston 133 is positioned at the lower-end (its lowermost) position (bottom dead center). That is, the initial state corresponds to a crank angle of the crankshaft 115a of 0° (bottom dead center).

In the initial state shown in FIG. 3, when the contact-arm switch 143 (refer to FIG. 6) is set (switched) to the ON state by the driver guide 141 being pressed against the workpiece and when the trigger 103a is pulled such that the trigger switch 103b switches to the ON state, the electric motor 111 is energized and its motor output shaft is rotatably driven. As a result, the crank mechanism 115 is rotatably driven via the speed-reducing mechanism 113, and the compression piston 133 is caused to move upward from its bottom dead center. At this time, because the solenoid valve 137 is disposed at a position that closes or blocks the air passage 135, the air inside the compression chamber 131a is compressed by the (upward) movement of the compression piston 133.

When the compression piston 133 reaches an upper-end position (its top dead center), which corresponds to the state in which the crank angle of the crankshaft 115a is 180° as calculated by the crank-angle detection unit 109E using a signal from the magnetic sensor 150, the compressed air inside the compression chamber 131a reaches a maximum compression state. At this time, the solenoid valve 137 is moved rearward by the electromagnet 138. As a result, the annular groove 121c is permitted to fluidly communicate with the cylinder chamber 121a, and the compressed air inside the compression chamber 131a is supplied to (flows into) the cylinder chamber 121a via the air passage 135. When the compressed air is supplied to the cylinder chamber 121a, the driving piston 123 is moved forward, as shown in FIG. 7, by the action of the "air spring" generated by the compressed air. Furthermore, the driver 125 of the driving piston 123, which has moved forward, strikes (hammers) the nail that is sitting (standing by) in the driving passage 141a of the driver guide 141. This striking (impact) causes the nail to be forcibly driven out (ejected from the ejection port) and then driven into the workpiece.

Figure 8:
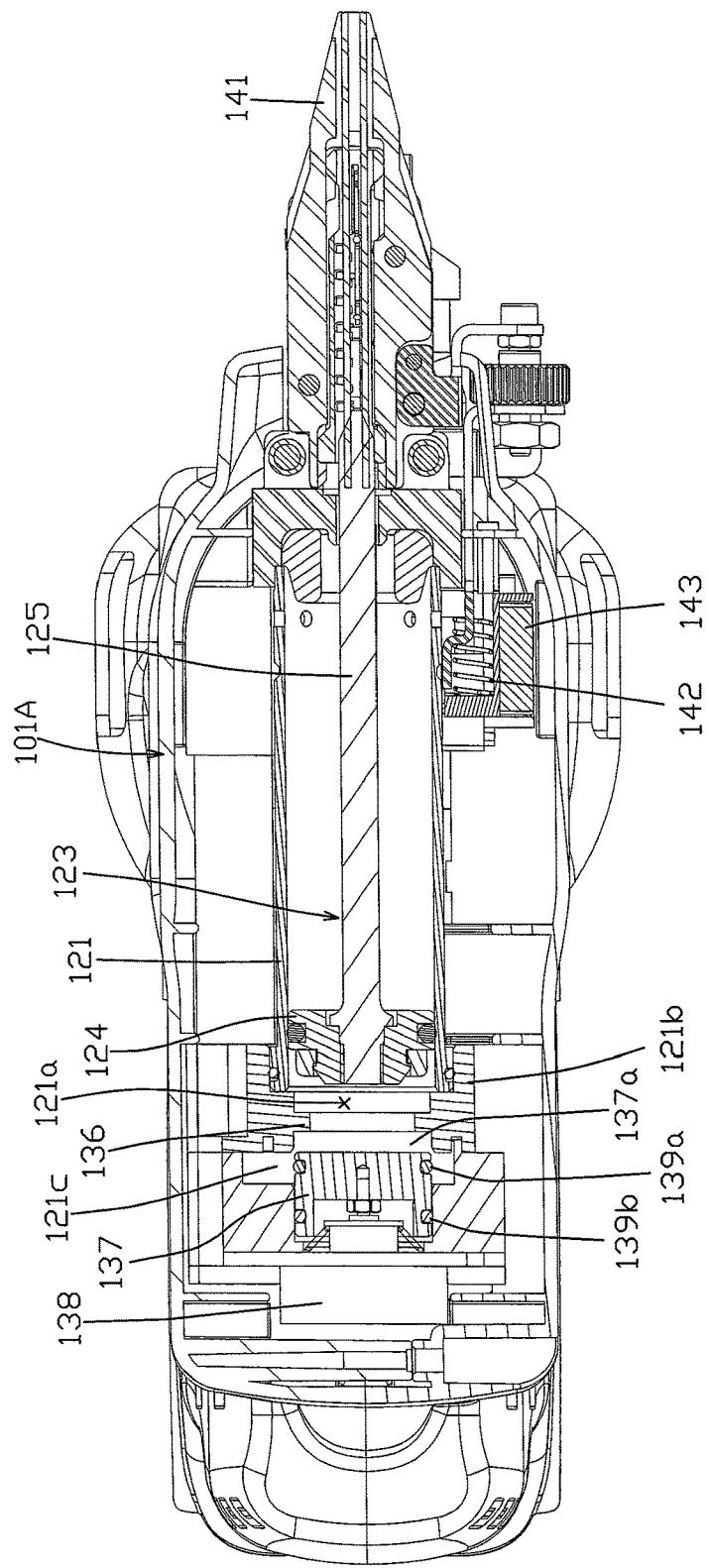
FIG. 8 shows the state in which the open state of the valve is maintained and the driving (second) piston has returned nearly to its rearward initial position shown in FIG. 6.

After the nail has been ejected, the compression piston 133 continues to move from its top dead center toward its bottom dead center. Consequently, the volume of the compression chamber 131a increases and the air pressure inside the compression chamber 131a becomes a reduced (negative) pressure, i.e. lower than atmospheric pressure. The reduced pressure that arises (is generated) inside the compression chamber 131a acts on the driving piston 123 via the air passage 135 and the cylinder chamber 121a. As shown in FIG. 8, this causes the driving piston 123 to be suctioned and moved rearward. Furthermore, the driving piston 123 makes contact with the stopper 136 and is again positioned at the initial position. The solenoid valve 137 maintains the open state of the air passage 135 until the driving piston 123 has moved to its initial position. When the driving piston 123 is positioned at the initial position, the solenoid valve 137 moves forward and closes (blocks) the air passage 135. Furthermore, the control unit 109 is configured (programmed) to cause the speed (energy) of the compression piston 133 to be actively or forcibly reduced (e.g., braked), for example, when the crank-angle detection unit 109E detects that the crank angle of the crankshaft 115a is 310°, whereby the control apparatus 109 reduces the speed of and then stops the compression piston 133. That is, the motor-control unit 109D brakes the electric motor 111 by outputting a brake signal from the drive-signal output unit 109C to the motor-control unit 109D. Thereby, the compression piston 133 is braked and stops more quickly, or in a shorter distance, than if only bearing and/or sliding friction were to brake the movement of the compression piston 133 back to its bottom dead center (initial position).

When the compression piston 133 is again positioned at (returns to) the initial position (bottom dead center), even if the trigger switch 103b and the contact-arm switch 143 continue to be maintained in the ON state, the supply of electric current to the electric motor 111 is cut off and thereby the electric motor 111 is stopped. That is, even if the switch-detection unit 109B detects that the trigger switch 103b and the contact-arm switch 143 are (still) in the ON state, the drive-signal output unit 109C outputs a stop signal to the motor-control unit 109D. Thereby, the motor-control unit 109D performs control to maintain the electric motor 111 in a stopped state. At this time, one cycle of the nail driving operation ends. Furthermore, the LED-control unit 109F preferably controls (activates) the LED 107, so that the LED 107 illuminates the tip area of the driver guide 141 at least during the nail driving operation and possibly thereafter, e.g., for a predetermined period of time thereafter. An LED-operation switch 160, which may be manually operable by a user, is connected to the LED-control unit 109F, and the LED-control unit 109F turns the LED 107 ON if the LED-operation switch 160 is in the ON state. The LED 107 and the LED-operation switch 160 serve as representative examples of an "electrical device" and an "electrical-device switch" in the present disclosure.

Furthermore, the nailer 100 is preferably also configured to perform a "continuous driving operation" wherein, instead of only a single-shot (intermittent) driving operation that drives one nail in a single operation, multiple nails are successively driven at discretionary time intervals. That is, a continuous driving operation is performed by ceasing, after one driving operation, the pressing of the driver guide 141 against the workpiece and then performing the next nail-driving operation by once again pressing the driver guide 141 against another portion of the workpiece while the trigger 103a is continuously squeezed. In other words, in a single-shot (intermittent) driving operation, one nail is driven out for each single operation (squeeze and release) of the trigger 103a; on the other hand, in a continuous driving operation, multiple nails are driven out in the state wherein the trigger 103a is operated (squeezed and held) one time.

As was described above, when the control apparatus 109 performs a driving operation, electric current is supplied from the battery pack 110 to the switch-detection unit 109B, the drive-signal output unit 109C, the motor-control unit 109D, the crank-angle calculation unit 109E, the LED-control unit 109F, and the timer 109G, which serve as a plurality of control units for operating the nailer 100 and for driving a nail. However, when the nailer 100 is not driving a nail, there is no need to supply the same amount of electric current as the electric current supplied to each of the control units when a driving operation is being performed. But, if the electric current to the control apparatus 109 were to be temporarily cut off completely, then it will take some time to start up the control apparatus 109 again when the next driving operation is desired, and consequently the user will not be able to immediately drive a nail. Therefore, the user would be inconvenienced by having to wait for the control apparatus 109 to start up if the nailer 100 is in a reduced current mode (sleep mode) at the time that the user wants to perform the nail driving operation. Accordingly, in the present embodiment, the nailer 100 is configured so as to switch between a drive-enabled mode (motor enabled-drive mode, also identified as the "electric current-supplying mode" herein), in which electric current needed to perform a driving operation is supplied to each of the electrical components (structural elements) 109B-109G of the control apparatus 109, and a sleep mode (low-power mode, also identified as the "reduced current mode" herein), in which the functions of parts of the control apparatus 109 are stopped in order to reduce the electric current consumption of the control apparatus 109. In particular, the present embodiment is configured such that the mode is switched to the sleep mode by the controller (microcomputer) 109a. More specifically, by designing the controller (microcomputer) 109a to have a power-saving function (sleep mode), the required (normal) electric current is supplied only to the sleep-control unit 109A and the amount of electric current supplied to one or more of the other electrical components (structural elements) 109B-109G is reduced or cut off. That is, in the sleep mode, the current consumption of one or more of the switch-detection unit 109B, the drive-signal output unit 109C, the motor-control unit 109D, the crank-angle calculation unit 109E, the LED-control unit 109F, and the timer 109G, preferably all of these electrical components, is reduced and/or stopped.

In the drive-enabled mode, after the nailer 100 completes a driving operation, the electric motor 111 is not driven until the start of the next driving operation. Consequently, in the present embodiment, the mode (operational state of the nailer 100) is switched from the drive-enabled mode to the sleep mode based on the drive state of the electric motor 111, as will be further described below.

For example, the control apparatus 109 preferably may detect whether the electric motor 111 is being driven or is stopped based on the crank angle of the crankshaft 115a as calculated (determined) by the crank-angle calculation unit 109E. That is, if the crank angle does not change for a prescribed time period, then it is determined that the crankshaft 115a is not rotating and therefore that the electric motor 111 is stopped. On the other hand, if the crank angle does change (i.e. the control apparatus 109 detects a change of the crank angle based upon signals from the magnetic sensor 150) within the prescribed time period, then it is determined that the crankshaft 115a is rotating and therefore that the electric motor 111 is being driven. Accordingly, the drive/stopped state of the electric motor 111 is detected based on the rate of change of the crank angle per unit of time. As a prescribed first condition for entering the sleep mode, if the switch-detection unit 109B detects that both the trigger switch 103b and the contact-arm switch 143 are in the OFF state after the electric motor 111 has stopped and if the stopped time period of the electric motor 111 as measured by the timer 109G exceeds a set first time period (e.g., 1 min.), then the control apparatus 109 (specifically the sleep-control unit 109A) switches the drive mode of the nailer 100 from the drive-enabled mode to the sleep mode.

In addition, as a prescribed second condition for entering the sleep mode, even if both the trigger switch 103b and contact-arm switch 143 are not in the OFF state after the electric motor 111 has stopped, but if the stopped time period of the electric motor 111 as measured by the timer 109G exceeds a prescribed second time period (e.g., 10 min.), which is longer than the first time period, then the control apparatus 109 likewise switches the mode (operational state) of the nailer 100 from the drive-enabled mode to the sleep mode. The timer 109G serves as a representative example of a "motor-operation-state detection unit" in the present disclosure.

In the sleep mode, the sleep-control unit 109A of the control apparatus 109 may cut off the electric current supplied from the battery pack 110 to one or more of the switch-detection unit 109B, the drive-signal output unit 109C, the motor-control unit 109D, the crank-angle calculation unit 109E, the LED-control unit 109F, and the timer 109G, e.g., the current to all of these electrical components is cut off. In addition or in the alternative, in the sleep mode, instead of simply cutting off the electric current completely to one or more of these electrical components, the sleep-control unit 109A may supply an electric current (also called a standby current) that is smaller than the electric current that is normally supplied to each of these electrical components (structural elements) in the drive-enabled mode. The sleep-control unit 109A serves as a representative example of an "electric-current-supply control unit" in the present disclosure.

When either of the above-mentioned first and second conditions is satisfied, the electric current supplied to the switch-detection unit 109B and the crank-angle calculation unit 109E is cut off or reduced based on the detection results of the switch-detection unit 109B and the crank-angle calculation unit 109E. In other words, the detection results of the switch-detection unit 109B and the crank-angle calculation unit 109E are used as the basis for setting one or more of the above-mentioned electrical components to the sleep state.

As was described above, by being switched to the sleep mode, one or more (e.g. all) of the switch-detection unit 109B, the drive-signal output unit 109C, the motor-control unit 109D, the crank-angle calculation unit 109E, the LED-control unit 109F, and the timer 109G switch to the sleep state (also called the standby state). Thereby, the functions of parts of the control apparatus 109 are stopped or are put into a significantly reduced current mode. As a result, the electric current consumption of the control apparatus 109 is reduced overall. The sleep state in which the functions of parts of the control apparatus 109 are stopped or limited serves as a representative example of a "reduced current mode" in the present disclosure.

Furthermore, in the drive-enabled mode, the LED 107 is ON while the LED-operation switch 160 is in the ON state. When the LED 107 is ON, there is a high likelihood that the user will perform further driving operations. Accordingly, in an optional further embodiment of the present teachings, while the ON state of the LED-operation switch 160 is detected, the mode (operational state) does not transition to the sleep mode even if one of the above-mentioned prescribed first or second conditions is satisfied.

In the sleep mode, it is preferable, although not necessary, that only the sleep-control unit 109A of the control apparatus 109 operates. In other words, electric current is preferably supplied only to the sleep-control unit 109A so that only the sleep-control unit 109A of the control apparatus 109 operates. The sleep-control unit 109A is connected to the trigger switch 103b and the contact-arm switch 143 and is capable of detecting the switch state of both switches. Consequently, in the present embodiment, the sleep-control unit 109A switches from the sleep mode to the drive-enabled mode based on a (detected) change in the state of the trigger switch 103b or in the contact-arm switch 143 produced by the trigger 103a, the driver guide 141, or the like being operated when the user performs a driving operation. Upon detecting a change in the state of at least one of the switch 103b or switch 143, the mode (operational mode) is immediately switched from the sleep mode to the drive-enabled mode in order to begin the start up of the control apparatus 109 and prepare for another nail driving operation. Therefore, when the user actually operates both of the switch 103b and switch 143 (by squeezing the trigger 103 and simultaneously pressing the driver guide 141 against a workpiece), the time needed to initiate/perform the nail driving operation is reduced (or possibly even eliminated), because each of the control units of the control apparatus 109 was already started up again when either one of the switches 103b, 143 was actuated. In addition, by virtue of the fact that the mode (operational state) of the nailer 100 immediately changes when the user operates any one of the trigger 103a, the driver guide 141, or the like in order to begin the process for performing a nail driving operation, no other special operation (software operation) or circuitry for returning the mode from the sleep mode back to the drive-enabled mode is necessary.

However, as a safety function, the control apparatus 109 optionally may be configured such that a change from the sleep mode back to the drive-enabled state is not permitted unless the control apparatus 109 first detects that both switches, namely, the trigger switch 103b and the contact-arm switch 143, are in the OFF state. In particular, when the nailer 100 has been put into the sleep mode as a result of the above-mentioned prescribed second condition having been satisfied (without the first condition having been satisfied), the mode was switched to the sleep mode because the stopped time period of the electric motor 111 exceeded the second time period, even though the trigger switch 103b and/or the contact-arm switch 143 was (were) still in the ON state. Accordingly, as a safety mechanism when the mode has been switched to the sleep mode with the trigger switch 103b and/or the contact-arm switch 143 still in the ON state, it is particularly useful to wait to switch back to the drive-enabled mode until the sleep-control unit 109A has first detected that both switches, namely, the trigger switch 103b and the contact-arm switch 143, are in the OFF state. This precaution may help to prevent a possible unintentional misfiring of the nailer 100 when it is switched back to the drive-enabled mode, by ensuring that neither of the trigger switch 103b and the contact-arm switch 143 is in the ON state at the point in time when the switch back to the drive-enabled mode takes place.

Therefore, when the nailer 100 has been put into the sleep mode as a result of either one of the first or second prescribed conditions (discussed above) have been satisfied, upon the detection of either switch, namely, the trigger switch 103b or the contact-arm switch 143, being in the ON state after both switches have been detected as being in the OFF state, the control apparatus 109 (specifically, the sleep-control unit 109A) switches the drive mode of the nailer 100 from the sleep mode to the drive-enabled mode.

Thereby, the electric current that was cut off or reduced in the sleep mode is again supplied to the switch-detection unit 109B, the drive-signal output unit 109C, the motor-control unit 109D, the crank-angle calculation unit 109E, and the LED-control unit 109F. As a result, in the drive-enabled mode, all functions of the control apparatus 109 operate and it becomes possible to perform a (another) driving operation. The drive-enabled mode in which all functions of the control apparatus 109 operate serves as a representative example of an "electric-current supplying mode" or "motor drive-enabled mode" in the present disclosure.

According to the above-described present embodiment, the mode may be switched from the drive-enabled mode to the sleep mode based at least in part on the stopped time period of the electric motor 111, which serves as an indicator concerning the motor-operation state. This embodiment is advantageous as compared to a (hypothetical) configuration in which the mode is switched to the reduced current mode based on the operation and the ceasing of the operation of the operating member, such as the trigger 103a, for the following reason. It is possible that the mode will not properly switch to the sleep mode if, for example, a problem occurs with the trigger 103a, the driver guide 141, or the like, which serve as the operating member, a problem occurs with the switches 103b, 143, the circuits between the operating member and the electric motor 111, or the like. On the other hand, in the present embodiment, because the mode is switched to the sleep mode based at least in part on the stopped time period of the electric motor 111, which serves as an indicator concerning the operation state of the electric motor 111, the mode is properly switched to the sleep mode even if there is a temporary problem with (e.g., a jamming or temporary sticking of) the operating member, such as the trigger 103a or the driver guide 141, or if there is a problem with the switches 103b, 143, or the like. Accordingly, the mode is reliably switched to the sleep mode based on the drive state of the electric motor 111. As a result, the electric current consumption of the nailer 100 is reduced in a safe, reliable and efficient manner.

In addition, according to the present embodiment, the sleep-control unit 109A and the switch-detection unit 109B both detect the states of the trigger switch 103b and the contact-arm switch 143. Thereby, in the drive-enabled mode, the switch-detection unit 109B detects the switch state in order to perform a driving operation, whereas in the sleep mode, the sleep-control unit 109A detects the switch state in order to switch the mode from the sleep mode to the drive-enabled mode. Accordingly, the sleep-control unit 109A can detect the switch state at a timing separate (different) from the timing at which the switch-detection unit 109B detects the switch state.

In addition, according to the present embodiment, the first condition and the second condition are preferably set as the conditions in which the mode switches to the sleep mode. By utilizing (setting) a plurality of conditions, the mode is switched to the sleep mode such that the intention of the user performing the driving operation is properly reflected.

Furthermore, in the above-described embodiment, in the sleep mode, the electric current supplied to all of the switch-detection unit 109B, the drive-signal output unit 109C, the motor-control unit 109D, the crank-angle calculation unit 109E, the LED-control unit 109F, and the timer 109G is preferably cut off or reduced, but the present disclosure is not limited thereto. For example, the electric current may be cut off or reduced to at least one, or a plurality, of the switch-detection unit 109B, the drive-signal output unit 109C, the motor-control unit 109D, the crank-angle calculation unit 109E, the LED-control unit 109F, and the timer 109G. In addition, the electric current supplied to the sleep-control unit 109A may be reduced such that, within the sleep-control unit 109A, at least the regions (functional blocks, components, etc.) thereof that detect the state of the trigger switch 103b and the contact-arm switch 143 are (remain) operating.

In addition, in the above-described embodiment, all of the sleep-control unit 109A, the switch-detection unit 109B, the drive-signal output unit 109C, the crank-angle calculation unit 109E, the LED-control unit 109F, and the timer 109G are configured as part of the microcomputer, which includes, e.g., one or more microprocessors, but the present disclosure is not limited thereto. For example, at least one of the sleep-control unit 109A, the switch-detection unit 109B, the drive-signal output unit 109C, the crank-angle calculation unit 109E, the LED-control unit 109F, and the timer 109G may be configured not as part of a microcomputer (microprocessor) but rather as a separate (discrete) hardware component comprising analog, digital or mixed circuitry. In such a case, in the sleep mode, the electric current supplied to such hardware component(s) is reduced or cut off. That is, the sleep mode preferably includes a mode in which the electric current supplied to the microcomputer(s) is reduced, a mode in which the electric current supplied to the electric circuit(s) other than the microcomputer(s) is reduced, and a mode in which the electric current supplied to both the microcomputer(s) and the electric circuit(s) is reduced.

In addition, the above-described embodiment is configured such that the timer 109G measures the elapsed time period since the electric motor 111 stopped, wherein the elapsed time period serves as the stopped time period of the electric motor 111, but the present disclosure is not limited thereto. For example, the timer 109G may instead measure the elapsed time period since the point in time when the drive-signal output unit 109C output a brake signal, and this elapsed time period may serve the same function as (i.e. be functionally equivalent to) the stopped time period of the electric motor 111. In the alternative, the timer 109G may instead measure the elapsed time period since the point in time when the drive-signal output unit 109C stopped the output of the drive signal to the motor-control unit 109D, and this elapsed time period may serve the same function gas (i.e. be functionally equivalent to) the stopped time period of the electric motor 111. That is, the stopped time period of the electric motor 111, or its equivalents, preferably includes not only the time period during which the electric motor 111 is completely stopped but possibly also time periods immediately (shortly) before the electric motor 111 completely stops. Thus, for example, any of these time periods may optionally serve as the "motor stopped state" according to the present disclosure.

In addition, the above-described embodiment is configured such that the sleep-control unit 109A and the switch-detection unit 109B both detect the state of the trigger switch 103b and the state of the contact-arm switch 143, but the present disclosure is not limited thereto. For example, the switch-detection unit 109B alone may detect the state of the trigger switch 103b and the state of the contact-arm switch 143, and, based on only the detection result of the switch-detection unit 109B, the sleep-control unit 109A may switch the mode from the sleep mode to the drive-enabled mode. In this further embodiment of the present disclosure, the electric current supplied to the switch-detection unit 109B in the sleep mode preferably is not reduced.

In addition, in the above-described embodiment, the LED 107, which shines light onto the work area, is provided as the electrical device, but the present disclosure is not limited thereto. For example, a display (e.g., LED, LED, etc.) for displaying the drive state of the nailer 100, the residual amount of charge in the battery pack 110, or the like may be provided as the electrical device.

In addition, in the above-described embodiment, the LED-operation switch 160, which operates the LED 107, is provided, but the present disclosure is not limited thereto. For example, the ON/OFF state of the LED 107 may be controlled in accordance with the operation (ON/OFF) states of the trigger switch 103b and the contact-arm switch 143. For example, the LED 107 may be turned ON when either the trigger switch 103b or the contact-arm switch 143 changes to the ON state. On the other hand, the LED 107 may be turned OFF when both the trigger switch 103b and the contact-arm switch 143 change to the OFF state. Furthermore, after both the trigger switch 103b and the contact-arm switch 143 have changed to the OFF state, the LED 107 may be turned OFF only after a prescribed time period (e.g., 10 seconds) has elapsed.

In addition, in the above-described embodiment, the magnetic sensor 150 measures the rotational position of the crankshaft 115a, but the present disclosure is not limited thereto. For example, the magnet 151 may be attached to the motor shaft of the electric motor 111, and the magnetic sensor 150 may detect the drive (state) of the electric motor 111 by measuring the position of the motor shaft. In addition, instead of a magnetic sensor, a photointerrupter that comprises a light-receiving part and a light-emitting part, or the like, may be used as the sensor for determining the rotational position of the motor shaft.

Furthermore, the above embodiment was explained with the nailer 100 serving as a representative, non-limiting example of a driving tool according to the present disclosure, but the present teachings may be applied to driving tools other than a nailer, such as tackers and staplers. In addition, driving tools according to the present teachings are not limited to cordless power tools, to which the battery pack 110 is mounted, and may be applied to any power tool to which electric current (electric power) is supplied via a power supply cord. In addition, an engine, or the like, other than the electric motor 111, may be used as the drive source/mechanism, which e.g., drives a crank mechanism and/or a piston.

Taking into consideration the above objects of the present disclosure, the following additional representative embodiments of the driving tool according to the present disclosure can be configured. Furthermore, these embodiments, and any aspects utilized therein, may be used not only independently or in combination with each other but may also be used in combination with one or more of the features recited in the claims.

1. A driving tool that drives a driven article out of an ejection port, comprising:
 a motor for driving the driven article;
 a controller that controls the motor;
 a trigger that is manually operated by a user when driving the driving tool;
 a contact arm that is pressed against a workpiece when the driving tool is being driven;
 a trigger switch connected to the trigger; and
 a contact-arm switch connected to the contact arm;
wherein,
 the controller is configured such that the motor is driven when both the trigger switch and the contact-arm switch are switched to the ON state;
 the controller comprises a microcomputer and a drive circuit for driving the motor; the microcomputer comprises:
  a switch-state detection unit that detects the states of the trigger switch and the contact-arm switch;
  a motor-operation-state detection unit that detects the operation state of the motor; and
  a signal-output unit that outputs a signal for controlling the motor;
 the controller is configured such that it is capable of switching between an electric-current supplying mode, in which electric current is supplied to structural elements that include the motor-operation-state detection unit, the signal-output unit, and the motor-drive unit in order to drive the motor, and a reduced current mode, in which electric current supplied to at least one structural element among the motor-operation-state detection unit, the signal-output unit, and the motor-drive unit is reduced; and the controller is configured such that it switches to the reduced current mode based on an indicator concerning the motor-operation state.

2. A driving tool according to any embodiment, aspect or claim disclosed herein, wherein the electrical device is configured as an information display apparatus that displays information concerning the state of the driving tool.

3. A driving tool according to any embodiment, aspect or claim disclosed herein, wherein the electrical device is configured as an illuminator that illuminates the work area.

4. A driving tool according to any embodiment, aspect or claim disclosed herein, wherein in the reduced current mode, if at least one switch among the trigger switch and the contact-arm switch turns ON, then the controller switches the mode to the electric-current supplying mode.

5. A driving tool according to any embodiment, aspect or claim disclosed herein, wherein:
 a cylinder houses the piston;
 the driving tool is configured such that an air chamber inside the cylinder acts as an air spring by the movement of the piston within the cylinder; and
 the driven article is driven by the action of the air spring.

6. A driving tool according to any embodiment, aspect or claim disclosed herein, wherein the piston comprises a driver, which is driven by the air spring and drives the driven article.

7. A driving tool according to any embodiment, aspect or claim disclosed herein, wherein the motor-operation-state detection unit comprises a crank-angle detection unit, which detects the crank angle of the crank mechanism driven by the motor, and a timer.

8. A driving tool according to any embodiment, aspect or claim disclosed herein, wherein the controller calculates a motor-stopped time period, which serves as an indicator concerning the motor-operation state, based on the detection result of the crank-angle detection unit.

9. A driving tool according to any embodiment, aspect or claim disclosed herein, wherein a starting point of a motor-stopped time period is set as a point in time at which the output of the drive signal, which is for driving the motor, from the signal-output unit is stopped.

10. A driving tool according to any embodiment, aspect or claim disclosed herein, wherein the starting point of the motor-stopped time period is set as a point in time at which the brake signal that brakes the drive of the motor is output from the signal-output unit.

11. A driving tool according to any embodiment, aspect or claim disclosed herein, wherein the starting point of the motor-stopped time period is set as a point in time at which the output of the brake signal, which brakes the drive of the motor, from the signal-output unit is stopped.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved driving (power) tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block or component of a device, such as the control unit 109 is also understood as a corresponding method step or as a feature of a method step. In an analogous manner, aspects which have been described in the context of or as a method step also represent a description of a corresponding block or detail or feature of a corresponding device, such as the control unit 109.

Depending on certain implementation requirements, exemplary embodiments of the control unit 109 of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the control unit 109 or a "controller", are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components, and thus for example also perform complex processes using the electric motor 111 and other mechanical structures of the electro-pneumatic driving tool.

Therefore, although some aspects of the controller 109a have been identified as "units", it is understood that such units need not be physically separate or distinct electrical components, but rather may be different blocks of program code that are executed by the same hardware component, e.g., one or more microprocessors.

EXPLANATION OF THE REFERENCE NUMBERS

100 Nailer
101 Main-body housing
101A Driving-mechanism housing part
101B Compression-apparatus housing part
101C Motor-housing part
102 Inner-side housing
103 Handle part
103a Trigger
103b Trigger switch
105 Magazine
105a Pusher plate
107 LED
109 Control apparatus
109a Microcomputer or controller
109A Sleep-control unit
109B Switch-detection unit
109C Drive-signal output unit
109D Motor-control unit
109E Crank-angle calculation unit
109F LED-control unit
109G Timer
110 Battery pack
111 Electric motor
113 Planetary-gear-type, speed-reducing mechanism
115 Crank mechanism
115a Crankshaft
115b Eccentric pin
115c Connecting rod
120 Nail-driving mechanism
121 Driving cylinder
121a Cylinder chamber
121b Cylinder head
121c Annular groove
123 Driving piston
124 Piston-main-body part
125 Driver
130 Compression apparatus
131 Compression cylinder
131a Compression chamber
131b Cylinder head
133 Compression piston
135 Air passage
135a Communication port
135b Communication port
135c Communication path
136 Stopper
137 Solenoid valve
137a Valve chamber
138 Electromagnet
139a O-ring
139b O-ring
141 Driver guide
141a Driving passage
142 Biasing spring
143 Contact-arm switch
150 Magnetic sensor
151 Magnet
152 Hall-effect device
160 LED operation switch

I claim:

1. A driving tool configured to drive a driven article out of an ejection port, comprising:
a motor configured to generate a driving force for driving the driven article;
a controller configured to control the motor;
an operating member that is operable by a user when driving the driving tool; and
a switch that is switchable between an ON state and an OFF state in accordance with movement of the operating member;
wherein:
the controller is configured such that the motor is driven when the switch is switched to its the ON state;
the controller comprises:
a switch-state detection unit configured to detect the switch state;
a motor-operation-state detection unit configured to detect the operation state of the motor;
a signal-output unit configured to output a signal for controlling the motor; and
a motor-drive unit configured to drive the motor based on the signal output from the signal-output unit;
the controller is configured such that it is switchable between (i) an electric-current supplying mode, in which electric current is supplied to the motor-operation-state detection unit, the signal-output unit, and the motor-drive unit in order to drive the motor, and (ii) a reduced current mode, in which the electric current supplied to at least one unit selected from the group consisting of the motor-operation-state detection unit, the signal-output unit, and the motor-drive unit is reduced or cut off;
the controller is configured to calculate a stopped time period of the motor; and
the controller is configured to switch to the reduced current mode in response to a determination that a) the switch is in the OFF state and b) the stopped time period has exceeded a first predetermined time period; and
the controller is configured to switch to the reduced current mode in response to a determination that the stopped time period exceeds a second predetermined time period, which is longer than the first predetermined time period, even if the switch is not in the OFF state.

2. The driving tool according to claim 1, wherein the controller is configured such that it switches from the reduced current mode to the electric-current supplying mode based on a change of the switch state detected by the switch-state detection unit.

3. The driving tool according to claim 1, wherein the controller further comprises an electric-current-supply control unit and is configured such that, in the reduced current mode, the electric-current-supply control unit reduces the electric current supplied to the motor-operation-state detection unit, the signal-output unit, and the motor-drive unit and also reduces the electric current supplied to the switch-state detection unit.

4. The driving tool according to claim 1, further comprising:
a crank mechanism driven by the motor; and
a piston driven by the crank mechanism;
wherein:
the driving tool is configured such that movement of the piston causes the driven article to be driven;
the motor-operation-state detection unit comprises a crank-angle detection unit configured to detect the crank angle of the crank mechanism; and
the controller is configured to:
detect the motor-operation state based on a detection result of the crank-angle detection unit; and
reduce the electric current supplied to the crank-angle detection unit in the reduced current mode.

5. The driving tool according to claim 1, wherein:
the operating member includes a trigger, which is manually operable by the user, and a contact arm, which is configured to be operated when the driving tool is pressed against a workpiece;
the switch includes a trigger switch, which is switched by movement of the trigger, and a contact-arm switch, which is switched by movement of the contact arm; and
the controller is configured to drive the motor when the trigger switch and the contact-arm switch are simultaneously in the ON state.

6. A driving tool configured to drive a driven article out of an ejection port, comprising:
a motor configured to generate a driving force for driving the driven article;
a controller configured to control the motor;
an operating member that is operable by a user when driving the driving tool; and
a switch that is switchable between an ON state and an OFF state in accordance with movement of the operating member;
wherein:
the controller is configured such that the motor is driven when the switch is switched to the ON state;
the controller comprises:
a switch-state detection unit configured to detect the switch state;
a motor-operation-state detection unit configured to detect the operation state of the motor;
a signal-output unit configured to output a signal for controlling the motor; and
a motor-drive unit configured to drive the motor based on the signal output from the signal-output unit;
the controller is configured such that it is switchable between (i) an electric-current supplying mode, in which electric current is supplied to the motor-operation-state detection unit, the signal-output unit, and the motor-drive unit in order to drive the motor, and (ii) a reduced current mode, in which the electric current supplied to at least one unit selected from the group consisting of the motor-operation-state detection unit, the signal-output unit, and the motor-drive unit is reduced or cut off; and
the controller is configured such that it switches to the reduced current mode based on an indicator that is representative of the motor-operation state,
wherein:
the operating member includes a trigger, which is manually operable by the user, and a contact arm, which is configured to be operated when the driving tool is pressed against a workpiece;
the switch includes a trigger switch, which is switched by movement of the trigger, and a contact-arm switch, which is switched by movement of the contact arm;
the controller is configured to drive the motor when the trigger switch and the contact-arm switch are simultaneously in the ON state; and
the controller is configured to:
calculate a stopped time period of the motor, which serves as the indicator representative of the motor-operation state; and
switch to the reduced current mode in case both the trigger switch and the contact-arm switch are in the OFF state when the calculated stopped time period exceeds a first predetermined time period, and
wherein the controller is configured to switch to the reduced current mode in case the stopped time period exceeds a second predetermined time period, which is longer than the first predetermined time period, even without both the trigger switch and the contact-arm switch being in the OFF state.

7. The driving tool according to claim 6, wherein the controller is configured such that, after switching to the reduced current mode based upon the stopped time period exceeding the second predetermined time period, it does not switch from the reduced current mode back to the electric-current supplying mode unless and until the OFF states of both the trigger switch and the contact-arm switch are detected.

8. The driving tool according to claim 1, comprising:
an electrical device; and
an electrical-device switch configured to activate and deactivate the electrical device;
wherein the controller is configured to maintain the driving tool in the electric-current supplying mode while the electrical-device switch is in the activated state.

9. The driving tool according to claim 8, wherein the controller is configured such that it switches from the reduced current mode to the electric-current supplying mode in case the electrical-device switch switches from the deactivated state to the activated state.

10. A power tool, comprising:
a motor configured to movably drive a tool;
a switch operable, directly or indirectly, by a user and switchable between at least an ON state and an OFF state; and
a controller configured to:
switch to a motor drive-enabled mode, in which electric current is supplied to drive the motor, when the switch is switched to the ON state;
stop the supply of electric current to the motor when the switch is switched to the OFF state;
calculate a stopped time period of the motor;
switch to a reduced current mode, in which electric current supplied to at least one electrical component of the controller is reduced or cut off, in response to a determination (i) that the switch is in the OFF state and (ii) that the motor stopped state has exceeded a first predetermined time period; and switch to the reduced current mode in response to a determination that the stopped time period exceeds a second time period, which is longer than the first predetermined time period, even if the switch is not in the OFF state.

11. The power tool according to claim 10, wherein the controller is configured, in the reduced current mode, to reduce or cut off the supply of electric current to the at least one electrical component of the controller that is configured to perform a function selected from the group consisting of:

detecting the state of the switch for the purpose of controlling the output of the motor;

generating and outputting a signal for controlling the output of the motor based upon the detected state of the switch; and driving the motor based on the signal output for controlling the output of the motor.

12. The power tool according to claim 11, wherein the controller is further configured such that, in the reduced current mode, the controller monitors changes in the state of the switch and switches back to the motor drive-enabled mode upon detecting a change of the switch from the OFF state to the ON state.

13. The power tool according to claim 12, further comprising:

a crank mechanism driven by the motor; and a piston driven by the crank mechanism and operably coupled to the tool;

wherein the controller is further configured to:

detect a crank angle of the motor or the crank mechanism during the motor drive-enabled mode, determine, based upon the detected crank angle, when the motor stopped state has exceeded the predetermined period of time, and stop detecting the crank angle during the reduced current mode.

14. The power tool according to claim 13, wherein:

the switch includes a trigger switch, which is switchable by a user-operable trigger, and a contact-arm switch, which is switchable by a movable contact arm configured to be pressed against a workpiece; and the controller is configured to drive the motor only when the trigger switch and the contact-arm switch are simultaneously in the ON state.

15. The power tool according to claim 14, wherein the controller is further configured to switch to the reduced current mode in case both the trigger switch and the contact-arm switch are in the OFF state when the detected motor stopped state has exceeded a first predetermined time period.

16. The power tool according to claim 15, wherein the controller is further configured to switch to the reduced current mode in case the detected motor stopped state has exceeded a second predetermined time period, which is longer than the first predetermined time period, even if both the trigger switch and the contact-arm switch are not in the OFF state.

17. The power tool according to claim 16, wherein the controller is configured such that, after switching to the reduced current mode based upon the detected motor stopped state exceeding the second predetermined time period, the controller does not switch from the reduced current mode back to the motor drive-enabled mode unless and until the OFF states of both the trigger switch and the contact-arm switch are detected.

18. The power tool according to claim 17, further comprising:

an electrical device; and an electrical-device switch configured to activate and deactivate the electrical device;

wherein the controller is further configured to maintain the motor drive-enabled mode while the electrical-device switch is in the activated state, even if the detected motor stopped state has exceeded the second predetermined time period.

19. The power tool according to claim 18, wherein the controller is further configured to switch from the reduced current mode to the motor drive-enabled mode when the electrical-device switch switches from the deactivated state to the activated state.

20. The power tool according to claim 10, further comprising:

an electrical device; and an electrical-device switch configured to activate and deactivate the electrical device;

wherein the controller is further configured to:

maintain the motor drive-enabled mode while the electrical-device switch is in the activated state, even if the detected motor stopped state has exceeded the predetermined time period; and switch from the reduced current mode to the motor drive-enabled mode when the electrical-device switch switches from the deactivated state to the activated state.

21. The power tool according to claim 10, wherein the controller is configured such that, after switching to the reduced current mode based upon the detected motor stopped state exceeding the predetermined time period without the switch being detected in the OFF state, the controller does not switch from the reduced current mode back to the motor drive-enabled mode unless and until the OFF state of switch is detected.

* * * * *